US 6,585,258 B1

(12) United States Patent
Hirota et al.

(10) Patent No.: US 6,585,258 B1
(45) Date of Patent: Jul. 1, 2003

(54) AUTOMATIC DOCUMENT FEEDER HAVING A DOCUMENT SHUNTING PATH

(75) Inventors: Kazuhiro Hirota, Hachioji (JP); Hiroshi Nakagomi, Yamanashi-ken (JP); Yasuhito Watanabe, Yamanashi-ken (JP); Hiroshi Maeshima, Yamanashi-ken (JP); Kazunori Yoshioka, Yamanashi-ken (JP)

(73) Assignees: Konica Corporation, Tokyo (JP); Nisca Corporation, Yamanashi-ken (JP)

( * ) Notice: Subject to any disclaimer, the term of this patent is extended or adjusted under 35 U.S.C. 154(b) by 86 days.

(21) Appl. No.: 09/688,632

(22) Filed: Dec. 12, 2000

Related U.S. Application Data

(62) Division of application No. 09/095,271, filed on Jun. 10, 1998, now Pat. No. 6,145,834.

(30) Foreign Application Priority Data

Jun. 12, 1997 (JP) .............................. 9-155191
Jun. 12, 1997 (JP) .............................. 9-155407
Jun. 12, 1997 (JP) .............................. 9-155413
Jul. 28, 1997 (JP) .............................. 9-201210

(51) Int. Cl.⁷ .............................................. B65H 29/00
(52) U.S. Cl. ...................... 271/186; 271/69; 271/10.01
(58) Field of Search .............................. 271/225, 184, 271/186, 69, 10.01

(56) References Cited

U.S. PATENT DOCUMENTS

| | | | | | |
|---|---|---|---|---|---|
| 4,579,326 A | * | 4/1986 | Pinckney et al. | ........ | 271/186 X |
| 4,621,801 A | * | 11/1986 | Sanchez | .................. | 271/248 X |
| 4,744,553 A | * | 5/1988 | Hirose | ....................... | 271/3.05 |
| 4,884,097 A | * | 11/1989 | Giannetti et al. | ....... | 271/186 X |
| 4,884,794 A | * | 12/1989 | Dinatale et al. | ........ | 271/186 X |
| 5,018,716 A | * | 5/1991 | Yoshida et al. | ............. | 271/227 |
| 5,119,145 A | * | 6/1992 | Honjo et al. | ............ | 271/259 X |
| 5,132,742 A | * | 7/1992 | Goto | ....................... | 271/291 X |
| 5,203,554 A | * | 4/1993 | Suzuki et al. | .................. | 271/10 |
| 5,430,536 A | * | 7/1995 | Fullerton et al. | ........ | 271/184 X |
| 5,552,859 A | * | 9/1996 | Nakagawa et al. | ..... | 271/110 X |
| 5,596,399 A | * | 1/1997 | Dempsey et al. | ............. | 399/45 |
| 5,671,917 A | * | 9/1997 | Choho et al. | .......... | 271/285.01 |
| 5,754,934 A | * | 5/1998 | Kamezaki et al. | ...... | 271/225 X |
| 5,819,152 A | * | 10/1998 | Kobayashi et al. | ......... | 399/367 |
| 5,887,865 A | * | 3/1999 | Ishimaru | ..................... | 271/4.1 |
| 5,890,708 A | * | 4/1999 | Song | ........................ | 271/10.03 |
| 6,021,305 A | * | 2/2000 | Sato et al. | .............. | 271/225 X |
| 6,321,064 B1 | * | 11/2001 | Mizubata et al. | ........... | 399/370 |
| 6,393,251 B2 | * | 5/2002 | Kono | ......................... | 399/370 |

FOREIGN PATENT DOCUMENTS

| | | |
|---|---|---|
| JP | 8-133511 A | 5/1996 |
| JP | 8-133551 A | 5/1996 |

* cited by examiner

Primary Examiner—Christopher P. Ellis
Assistant Examiner—Richard Ridley
(74) Attorney, Agent, or Firm—Frishauf, Holtz, Goodman & Chick, P.C.

(57) ABSTRACT

In an automatic document feeder for use in an image forming device such as copy machine and facsimile machine: a document shunting path for temporarily shunting a document is provided at an upstream side of a document reading portion; in a different-size mixed mode where different sizes of documents are placed in a mixed manner, the leading edge and rear edge of the document are detected by a sensor during conveyance of the document in the direction toward the document reading portion, so that the length of the document is detected; thereafter the document is conveyed in the reverse direction so that the rear edge of the document is shunted into the document shunting path; and thereafter the document is again conveyed in the forward direction to conduct reading. Thus, it becomes unnecessary to provide, a longer conveyance path for detecting the length of the documents, so that the size of the feeder itself can be reduced.

5 Claims, 22 Drawing Sheets

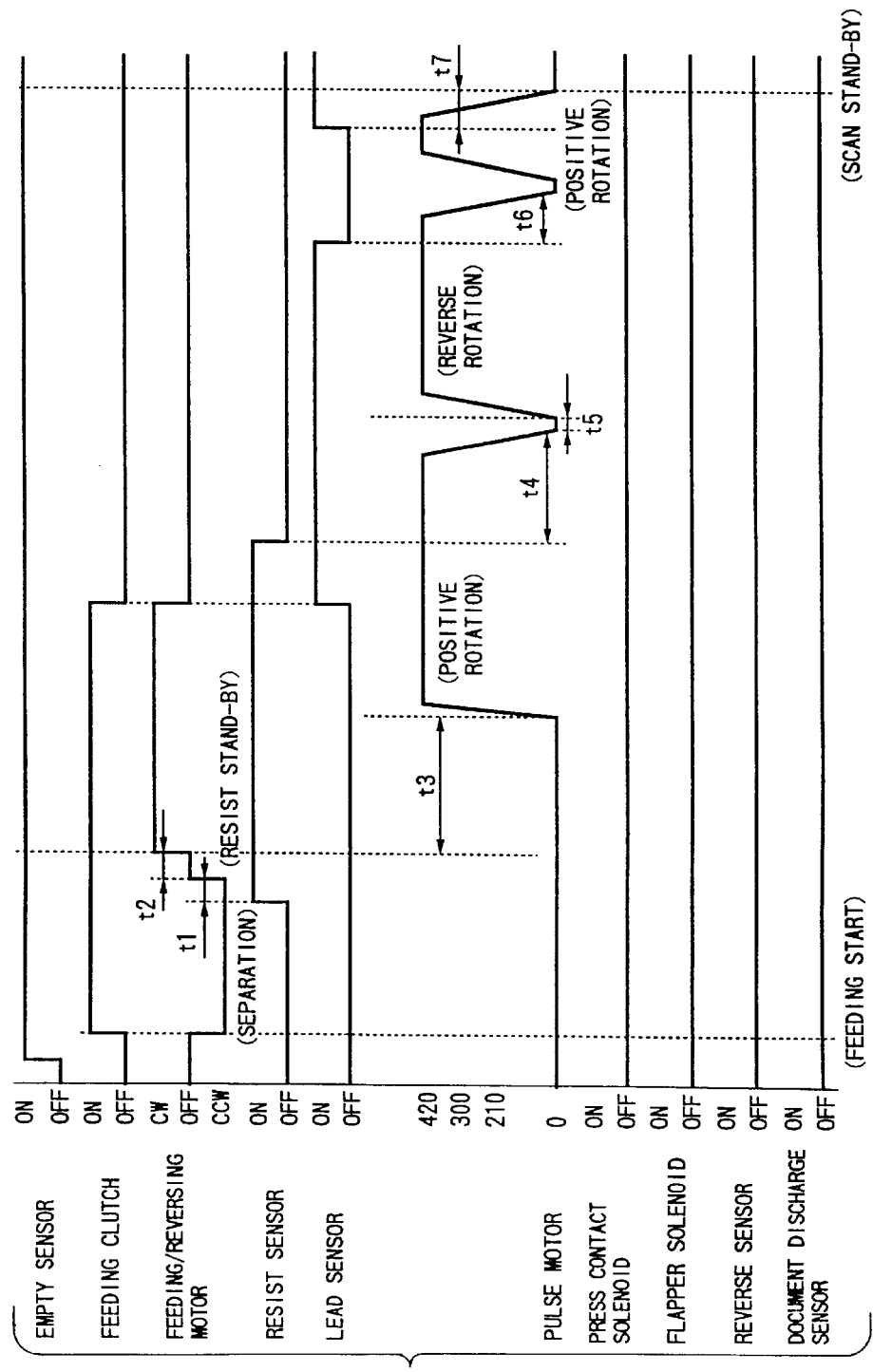

AUTOMATIC DOCUMENT FEEDER HAVING A DOCUMENT SHUNTING PATH

This is a division of application Ser. No. 09/095,271, filed Jun. 10, 1998, now U.S. Pat. No. 6,145,834.

BACKGROUND OF THE INVENTION

The present invention relates to an automatic document feeder which is adopted in an image reading apparatus such as a copy machine or facsimile machine.

BACKGROUND ART

In a conventional automatic document feeder such as disposed on a copy machine body, there has been generally adopted such a constitution that the documents placed on a document tray are automatically fed and conveyed sheet by sheet toward reading means on the copy machine body, and the fed document is read by an optical system in the copy machine body and then conveyed toward a discharge portion (see, Japanese Unexamined Patent Publication No.8-133551, as a similar technique).

Relatedly, it is necessary to previously inform the copy machine body of information about the document size, before reading the document fed from the document tray. Conventionally, there have been arranged a plurality of detection sensors along the document feeding direction in the document tray, and the length of documents have been detected by means of on/off operation of the detection sensors upon placement of documents onto the tray.

However, in the detection means as described above, when the document tray is fed with different sizes of documents in a mixed manner, the detection sensors are caused to constantly detect the maximum size among the mixed documents, causing such a problem that the information of document size is not accurately obtained.

As such, there has been also conventionally proposed a constitution that the detection sensors are arranged on a conveyance path extending from the document tray up to the document reading portion which is opposed to the reading means of the copy machine body and the size of each documents, which are fed from the document tray sheet by sheet, is detected on the conveyance path before the image on the document is read.

However, in such a method that the document size is detected on the conveyance path, as described above, there is required a long conveyance path which is commensurate with the possibly maximum size of document (such as A3 size of document placed in a lengthwise direction), causing a problem that the size of automatic document feeder is increased.

It is therefore an object of the present invention to provide an automatic document feeder which can assuredly detect the document size even by a shortened conveyance path before the image on the document is read, without increasing the size of the feeder itself.

Further, in a conventional automatic document feeder, there has been proposed a feeder capable of reading images on the double sides of the document. This feeder is constituted such that the document fed from a document tray is wound on a large sized conveying roller, conveyed to a document reading portion opposite to a reading means of a copy machine body to be read the front surface thereof in the document reading portion by the reading means of the copy machine body. After that, the document is then reversed by means of a switchback path provided on the downstream side, then the document is conveyed on the periphery of the conveying roller to be read the back surface of thereof and at the same time the document is again reversed by means of a reverse discharge path to be discharged on a discharge tray after page arrangement.

However, such an automatic document feeder as described above should provide both of the switchback path and the reverse discharge path, therefore, there is the problem that the path or feed mechanism becomes complex, resulting in a large sized automatic document feeder. On the other hand, if these two paths are combined into a single path, a radius of curvature of this single path should be made small, resulting in insufficient document conveyance effect.

Moreover, when the document is fed from the switchback path to the conveyance path, the leading edge of the document is aligned using the conveying roller. However, if a distance from the switchback path to a resist position is long as conventionally, since a distance wherein the document slidingly contacts with the periphery of the stopped conveying roller becomes longer, there is a fear that the document cannot be conveyed satisfactorily due to friction with the periphery of the conveying roller.

According to the present invention, the path structure and feeding mechanism are made simple to achieve the minimization of the automatic document feeder itself.

Further, according to the present invention, the radius of curvature of the document discharge path is made small to obtain a sufficient document conveyance effect.

Moreover, according to the present invention, the reversed document conveyed from the switchback path can be reliably aligned without an influence of the periphery friction of the conveying roller.

In the above described Japanese Unexamined Patent Publication No. 8-133551, there has been proposed such a constitution of a book mode for reading the document put on a platen other than a sheet through mode from reading the document being conveyed. In particular, in order to minimize the apparatus, a switchback path used for reading the double sides of the document by reversing the document, and a switchback path for reversing again the document of which double sides have been read to discharge to a discharge tray after page arrangement are further provided between the discharge tray and a platen cover.

However, in a case that a switchback path is provided between the discharge tray and the platen cover as described above, there is a necessity for pulling out the document from a narrow space between the discharge tray and the platen cover when a jam occurs, resulting in difficulty in a jammed document treatment.

According to the present invention, in an apparatus in which the document conveying path, such as a switchback path, is provided between the discharge tray and the platen cover, a document jammed in the document conveying path can be easily treated.

In an automatic document feeder, in order to align the document to be conveyed during the conveying process of the document fed from the document tray, it is necessary to provide a resist roller to feed the document to the reading means of the copy machine body after abutting the leading edge of the document to the resist roller thereby aligning the document. Conventionally, there is proposed an automatic document feeder in which a resist roller is disposed so as to be in pressure contact with a conveying roller, in order to reduce the conveying path from the document tray to the resist roller, so that the document fed from the feeding roller is abutted to the pressure contact portion between the conveying roller and the resist roller to thereby be aligned.

However, with such a constitution as described above, the conveying roller should be stopped at the resist time in order align the document on the conveying roller. Also, the next document cannot be fed to the resist position unless the conveyance of the preceding document is completed. Accordingly, intervals for feeding the document are lengthened, resulting in a long document treatment time.

Accordingly, it is an object of the present invention is to divide the process of document conveyance by means of the conveying roller from the aligning to thereby reduce the document treatment time.

SUMMARY OF THE INVENTION

To solve the aforementioned problems, the present invention provides an automatic document feeder comprising:

a document feeding portion for placing documents thereon;

document reading means for reading the documents;

a document discharging portion;

a document conveyance path connecting among the document feeding portion, the document reading portion and the document discharging portion;

a conveying roller, which is capable of forwardly rotating and reversely rotating, for conveying the documents along the document conveyance path;

a document shunting path branched from the document conveyance path;

first detection means for detecting a leading edge and a rear edge of the document; and second detection means, which is disposed in the document conveyance path on the downstream side of the first detection means, for detecting the leading edge of the document; and wherein the conveying roller is forwardly rotated to convey the document with the leading edge thereof headed, and, after the rear edge of the document is detected by the first detection means, the conveying roller is reversely rotated to move the rear edge side of the document into the document shunting path, until the leading edge of the document is moved back to a position on the upstream side of the document reading portion.

Further, the present invention provides an automatic document feeder comprising:

a document feeding portion for placing documents thereon;

document reading means for reading the documents;

a document discharging portion;

document conveying means for conveying the documents;

a document conveyance path for conveying the documents from the document feeding portion to the document reading portion or from the document reading portion to the document discharging portion;

a document shunting path branched from the document conveyance path; and document size detection means for detecting a document size by detecting the leading edge and the rear edge of the document;

wherein the document is conveyed to the document shunting path before being read by the document reading means, then the leading edge of the document is conveyed to the upstream side of the document reading means, and the document size detection means detects the document size while the document is conveyed from the document feeding portion through the document reading means.

According to such a constitution, it is unnecessary to provide a longer conveyance path of documents such as in the conventional, thereby minimizing the size of the document feeder and also detecting accurately the document size.

BRIEF DESCRIPTION OF THE DRAWINGS

FIG. 9 is a timing chart for feeding the document in a different-size mixed mode;

DESCRIPTION OF THE PREFERRED EMBODIMENT

Figure 1:
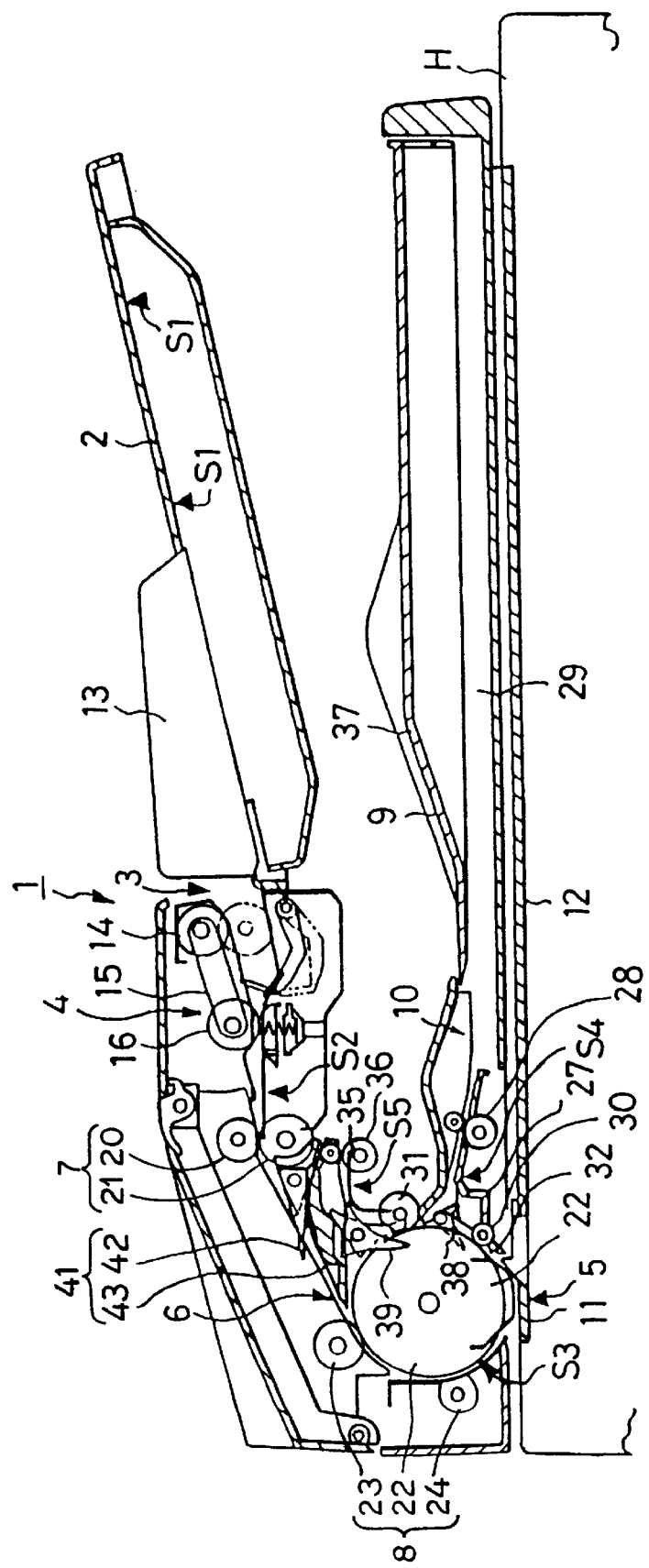
FIG. 1 is a schematic sectional view of an automatic document feeder according to the present invention.

There will be described hereinafter in detail an embodiment of an automatic document feeder according to the present invention, with reference to the accompanying drawings.

In the drawings, reference numeral 1 designates an automatic document feeder according to the present invention, which comprises: a document tray 2 for placing the documents thereon; document picking-up means 4 arranged adjacent to a document feeding opening 3; a document feeding path 6 extending from the document feeding opening 3 up to a document reading portion which faces to document reading means 5 of a copy machine body H; a resist roller 7 provided on the way of the document feeding path 6 to thereby align the leading edge of the document; conveying means 8 for conveying the aligned document to the document reading portion; a document discharging portion 9 for discharging the document read by the document reading means 5; and document reversing portion 10 provided between the document reading portion and the document discharging portion 9. Each of the documents placed on the document tray 2 is fed sheet by sheet to the document reading portion, and the document is discharged to the document discharging portion 9 after its front surface is read; or switched back at the document reversing portion 10 after its front surface is read, and again fed to the document reading portion by the conveying means 8 to thereby read the back surface of the document.

The copy machine body H is provided with: a transparent glass 11 used for reading the image on the document by the document reading means 5 when the document is automatically fed; and a platen 12 used for carrying a document such as book, to thereby read the same.

The document tray 2 is arranged obliquely toward the document feeding opening 3 of the feeder body, and is provided with a guide plate 13 moveable in the width direction of the documents. The width of documents is detected by the position of this guide plate 13. Further, the document tray 2 is provided with two size detection sensors S1 for detecting the length of the document in the feeding direction. These size detection sensors S1 may compare, for example, a limit switch or optical sensor. In case of a normal mode where all the documents placed on the document tray 2 have the same sizes, the size detection is performed by means of the guide plate 13 and the size detection sensors S1. In case of a "different-size mixed mode" where different sizes of documents are placed in a mixed manner, the size detection of documents is performed by means to be described later, without utilizing the guide plate 13 and size detection sensors S1.

The document picking-up means 4 is arranged near the document feeding opening 3, and comprises: a feeding roller 14 displaceable in the thickness direction of the documents placed on the document tray 2; an arm 15 for rotatably supporting the feeding roller 14; and a separation roller 16 positioned at the other end of the arm 15. The feeding roller 14 is normally held in a stand-by position, and moved from the stand-by position toward a feeding position by the operation of a feeding clutch 17a, whereafter the roller 14 is rotated by following the rotation of separation roller 16 to thereby feed the documents on the document tray 2 sheet by sheet. There is rotated the separation roller 16 via feeding clutch 17b which operates upon reverse rotation of a feeding/reversing motor 18, so that the documents are separated between separation pats sheet by sheet and thereafter fed to the document feeding path 6.

Arranged near the downstream side of the separation roller 16 is a resist sensor S2, and a resist roller 7 is arranged near the downstream side of the sensor S2. The resist sensor S2 detects the leading edge of the document in the normal mode, and the rear edge of document in addition to its leading edge in the different-size mixed mode. In the different-size mixed mode, the document size is determined by obtaining the document length based on the leading edge signal and rear edge signal which are detected by the resist sensor S2. The resist roller 7 comprises a driving roller 20 and a driven roller 21, and the driving roller 20 is rotated at a predetermined timing by the forward rotation of the feeding/reversing motor 18. After the leading edge of the document abuts the resist roller 7 so that the leading edge is aligned, the driving roller 20 is rotated after waiting a predetermined time, to thereby pinch the document cooperatively with the driven roller 21 to convey the document into the document feeding path 6.

The conveying means 8 comprises a conveying roller 22 for revolvingly conveying the document; and pinch rollers 23, 24 arranged on the periphery of the conveying roller 22. The document is gripped between the conveying roller 22 and the pinch rollers 23, 24, and fed to the document reading portion which is opposed to the document reading means 5. The rotational direction of the conveying roller 22 is switched by the forward and reverse rotations of a pulse motor 25.

There is disposed a lead sensor S3 at the upstream side of the document reading portion. In the normal mode, this lead sensor S3 is utilized to detect the leading edge of the document, and the rotation of the conveying roller 22 is stopped based on the detection signal from the sensor S3 to thereby hold the document in a reading stand-by state. In the different-size mixed mode, the sensor S3 also detects the leading edge of the document which is being reversely conveyed (i.e., the rear edge in the conveying direction during the reverse conveyance). The forward conveyance of the document is resumed based on the reading start signal supplied from the copy machine body H. The reading of document is performed by the document reading means 5 when the document passes over the surface of the transparent glass 11.

Figure 3:
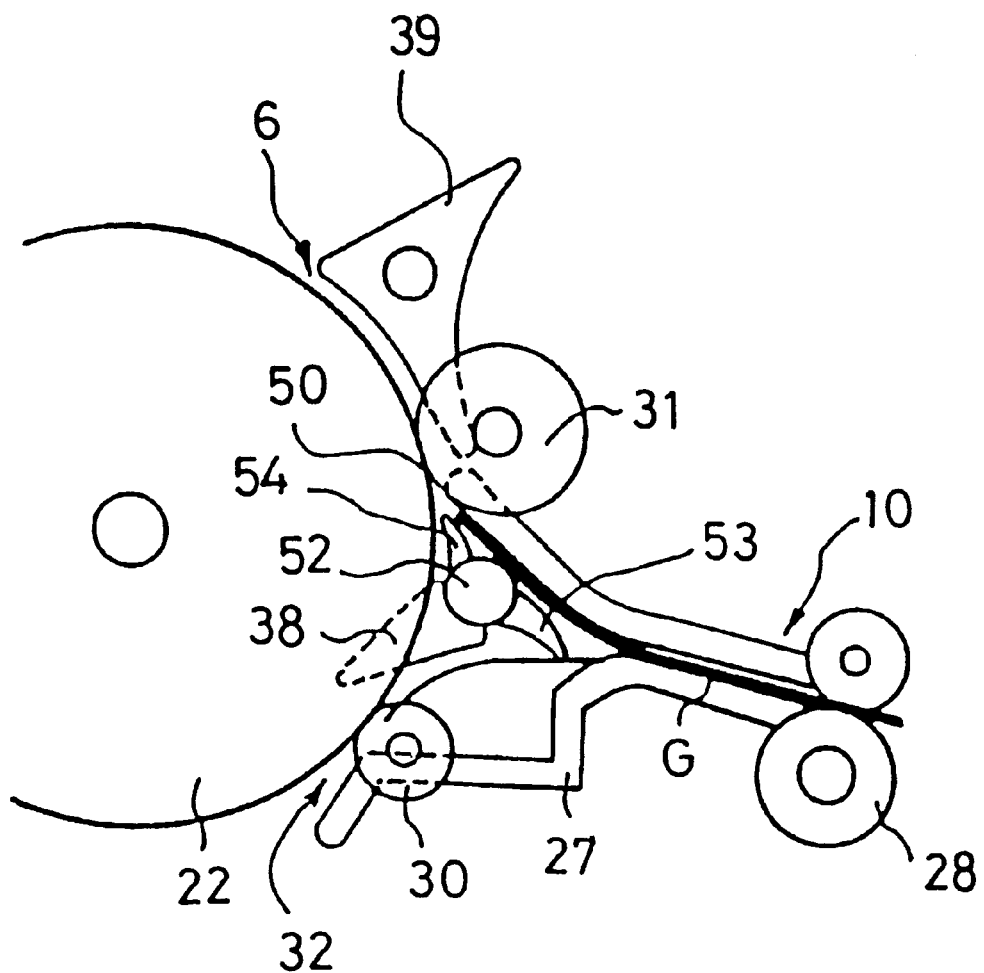
FIG. 3 is an enlarged view of a structure in the vicinity of a document reversing portion.

The document reversing portion 10 is positioned downstream of the document reading portion, and comprises: an introducing guide 27 with an opening thereof being flared; and a pair of reversing rollers 28 disposed near the guide 27; and a switchback path 29 provided at the rear side of the rollers 28. As shown in FIG. 3, pinch rollers 30 and 31 are provided at an inlet end and an outlet end of the introducing guide 27, respectively, to thereby promote the conveyance in a document discharge path 32 and the conveyance and discharge of document into and from the document reversing portion 10. Particularly, the pinch roller 31 at the outlet end also has a function as a reverse resist at the time of rear surface reading of the document G. That is, the pinch roller 31 which is in pressure contact with the conveying roller 22, rotates together with the conveying roller 22 by driving the conveying roller 22. But, at the time of aligning, the rotation of the conveying roller 22 is stopped to abut the leading edge of the document G to a pressure contact position 50 between the pinch roller 31 and the conveying roller 22, thereby aligning the document G. Thus, since the reverse resist is carried out at the outlet end of the document reversing portion 10, the leading edge of the document G is not in sliding contact with the periphery of the conveying roller 22. The reversing rollers 28 are opened and closed by a solenoid 33, and are adapted to rotate in the forward and reverse directions by means of the feeding/reversing motor 18, so that the document is reversely fed after switching back the conveyance direction of the document from its leading edge to its rear edge by the forward rotation and reverse rotation of the reversing rollers 28. There is disposed a reverse sensor S4 near the reversing rollers 28.

The document discharging portion 9 is disposed under the document tray 2, and comprises: upper and lower paired guides 35 which continuously extend from the document discharge opening; a pair of document discharging rollers 36 provided on the way of the guides 35; and a discharge tray 37. The document discharging rollers 36 are adapted to rotate in the forward and reverse directions by means of the pulse motor 25. Disposed near the document discharging rollers 36 is a document discharge sensor S5 for detecting the discharge of document.

Figure 4:
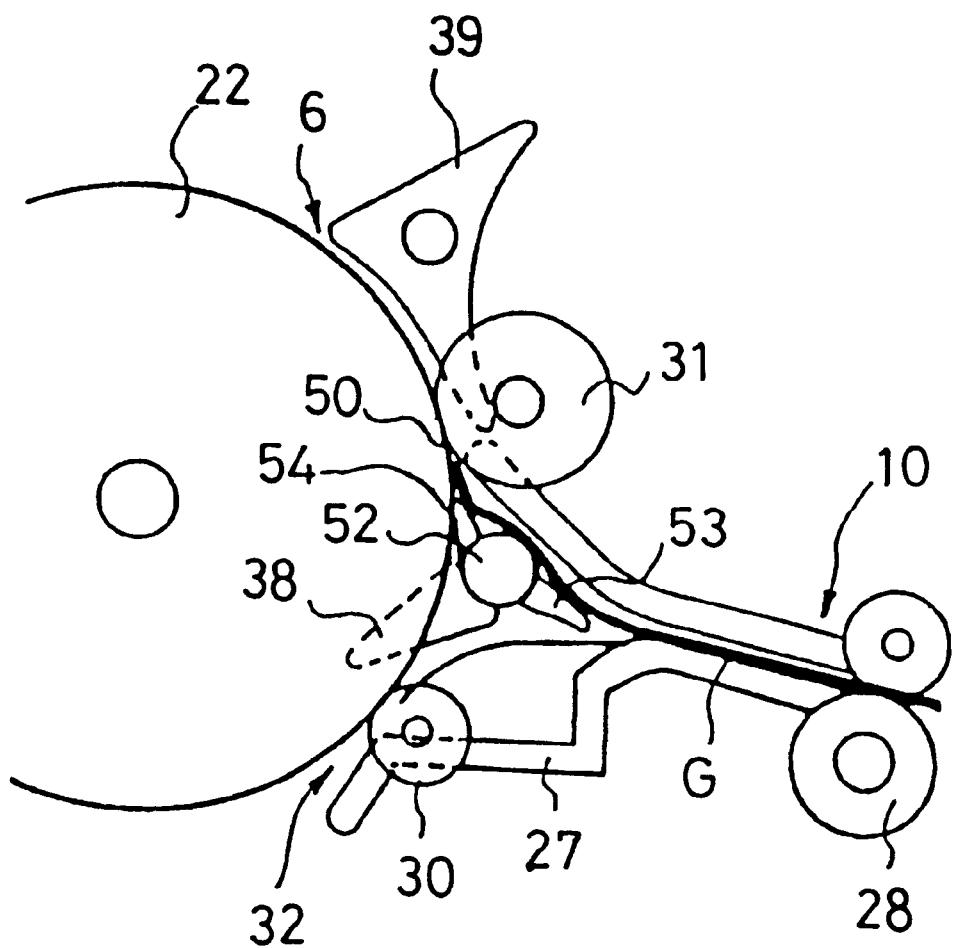
FIG. 4 is an enlarged view of a aligning state in the vicinity of the exit of the document reversing portion.
Figure 5:
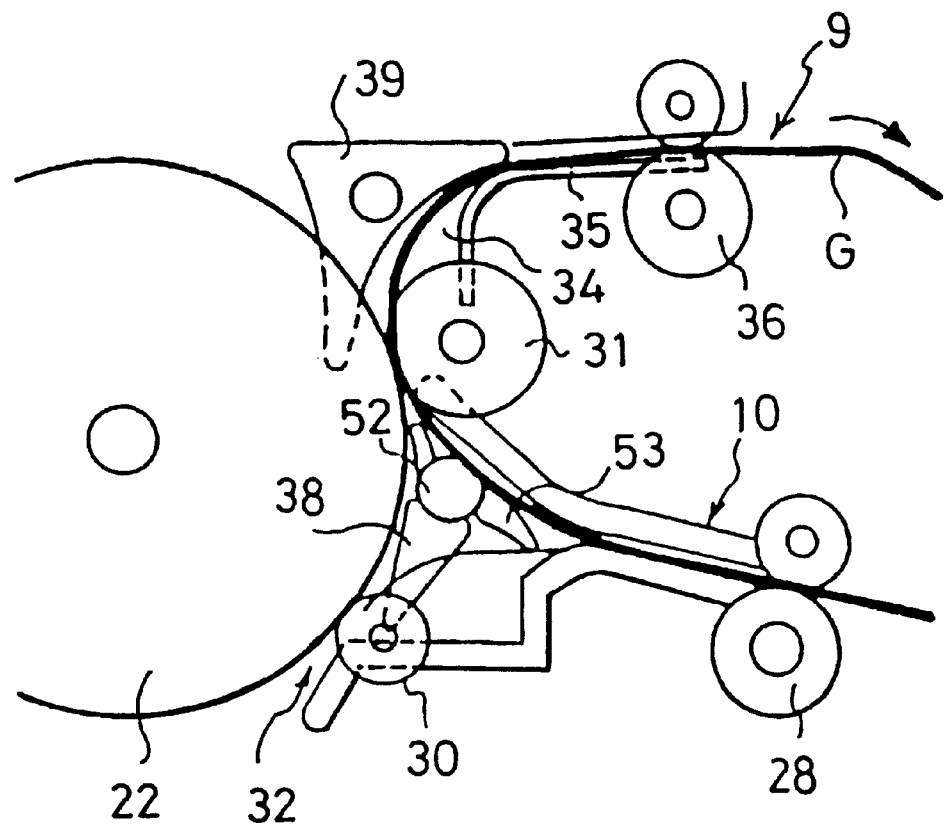
FIG. 5 is an enlarged view of a discharge path from the document reversing portion to the document discharging portion.

Around the conveying roller 22, there are provided a flapper 38 near the inlet of the document reversing portion 10, and a flapper 39 near the inlet of the document discharging portion 9, respectively, for switching the conveyance direction of the document. The former flapper 38, as shown in FIG. 3, is disposed in the introducing guide 27 which is put between the pinch rollers 30 and 31, and switches the conveyance path of the document to a path on the side of the document reversing portion as shown in FIG. 3 and to a path on the side of the discharge path 32 as shown in FIG. 5. A control flapper 53 which is hanging down due to its weight, is rotatably provided on one side of a rotation shaft 52 of the flapper 38, on the other side of the rotation shaft 52, a guide piece 54 which rotates integrally with the control flapper 53, is provided. This guide piece 54 is abutted to the leading edge of the document when feeding the document from the document reversing portion, to thereby introduce the document to the pressure contact position 50 between the conveying roller 22 and the pinch roller 31. Thus, the leading edge of the document can be prevented from slidingly contacting the periphery of the conveying roller 22. Additionally, in this embodiment, since the guide piece 54 rotates integrally with the control flapper 53 which is hanging down due to its weight, as shown in FIG. 3, the guide piece 54 rises due to the weight of the control flapper 53 when the document is reversed, thus the leading edge of the document G can be easily introduced to the pressure contact position 50. Further, as shown in FIG. 4, after the leading edge of the document G reaches the pressure contact position 50, a little document loop is formed between the guide piece 54 to press the guide piece 54 onto the conveying roller 22, and at the same time, there occurs a force to press back the guide piece 54 due to the weight of the control flapper 53. Therefore, the leading edge can be further contacted with the pressure contact position 50 to further improve the alignment effect.

The flapper 39 provided near the downstream side of the pinch roller 31 is used for switching the document between the document feeding path 6 and the document discharging portion 9. The switching of this flapper 39 is made together with the flapper 38 by means of a solenoid 40.

In this embodiment, there is formed a document shunting path 41 in the document feeding path 6 between the resist roller 7 and the pinch roller 23 being pressed onto the conveying roller 22, in which the path 41 is downwardly branched from the document feeding path 6. This document shunting path 41 is defined by a flapper 42 which is normally urged upwardly by a spring so that a distal end of flapper 42 projects into the document feeding path 6, and a guide plate 43 which forms a shunt path having a curved shape cooperatively with the lower surface of the flapper 42. The flapper 42 is pushed downwardly, when the document is conveyed thereon, to sink from the document feeding path 6. The distal end of flapper 42 projects into the document feeding path 6, when no documents are being conveyed thereon, to open the shunt path.

There will be explained hereinafter the automatic reading of document by means of the automatic document feeder having the aforementioned constitution, with reference to the timing charts shown in FIGS. 6 through 9 and the motional views of the document shown in 10(*a*) through 13(*c*).

Figure 6:
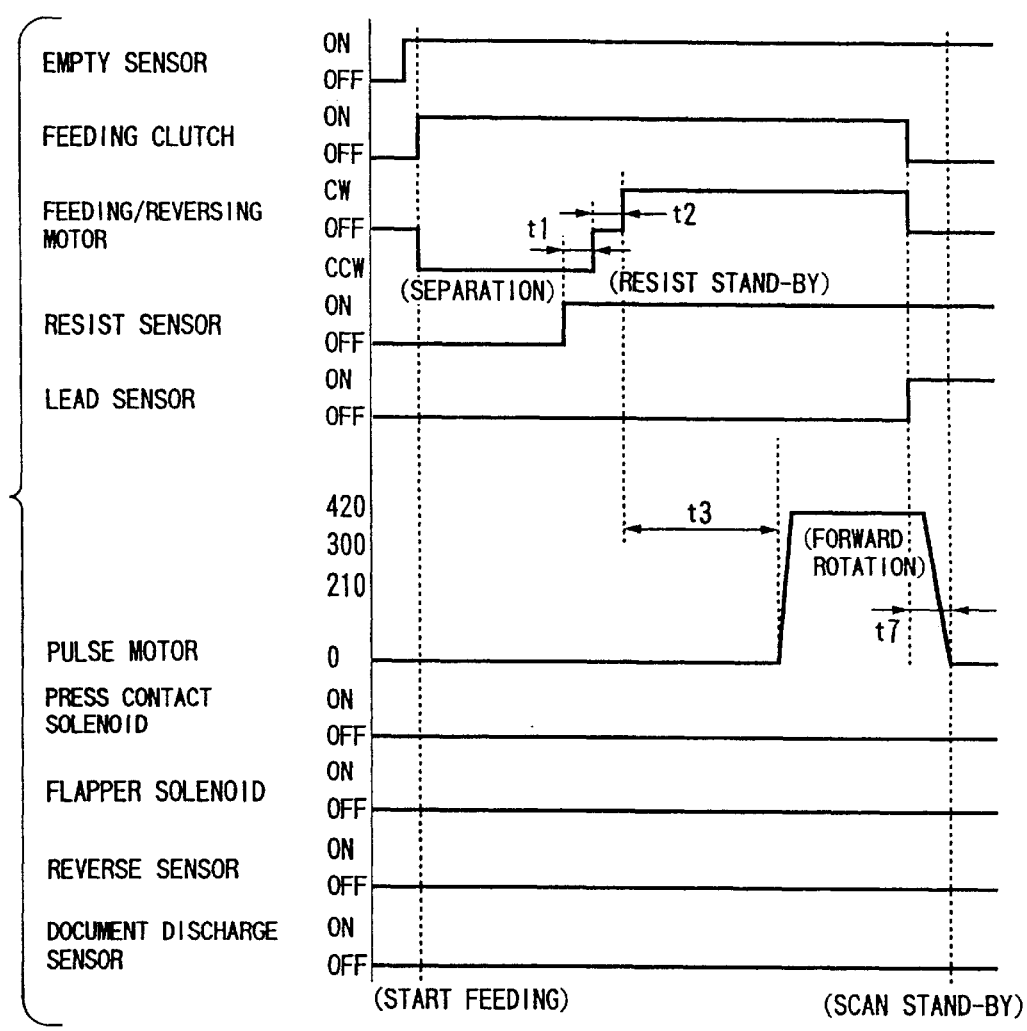
FIG. 6 is a timing chart for feeding the document, in one side reading in a normal mode.
Figure 7:
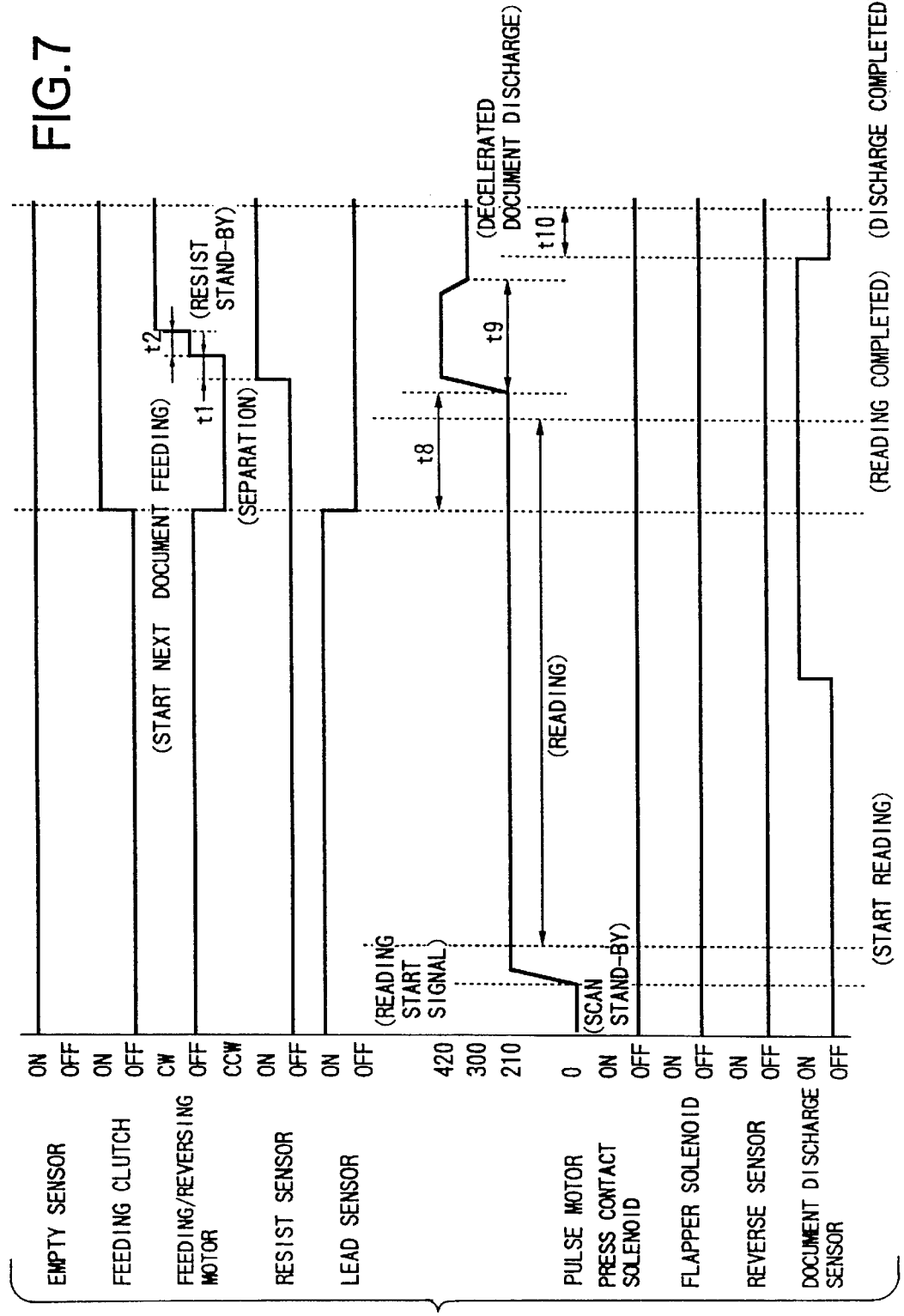
FIG. 7 is a timing chart for conveying and discharging the document, in one side reading in the normal mode.
Figure 8:
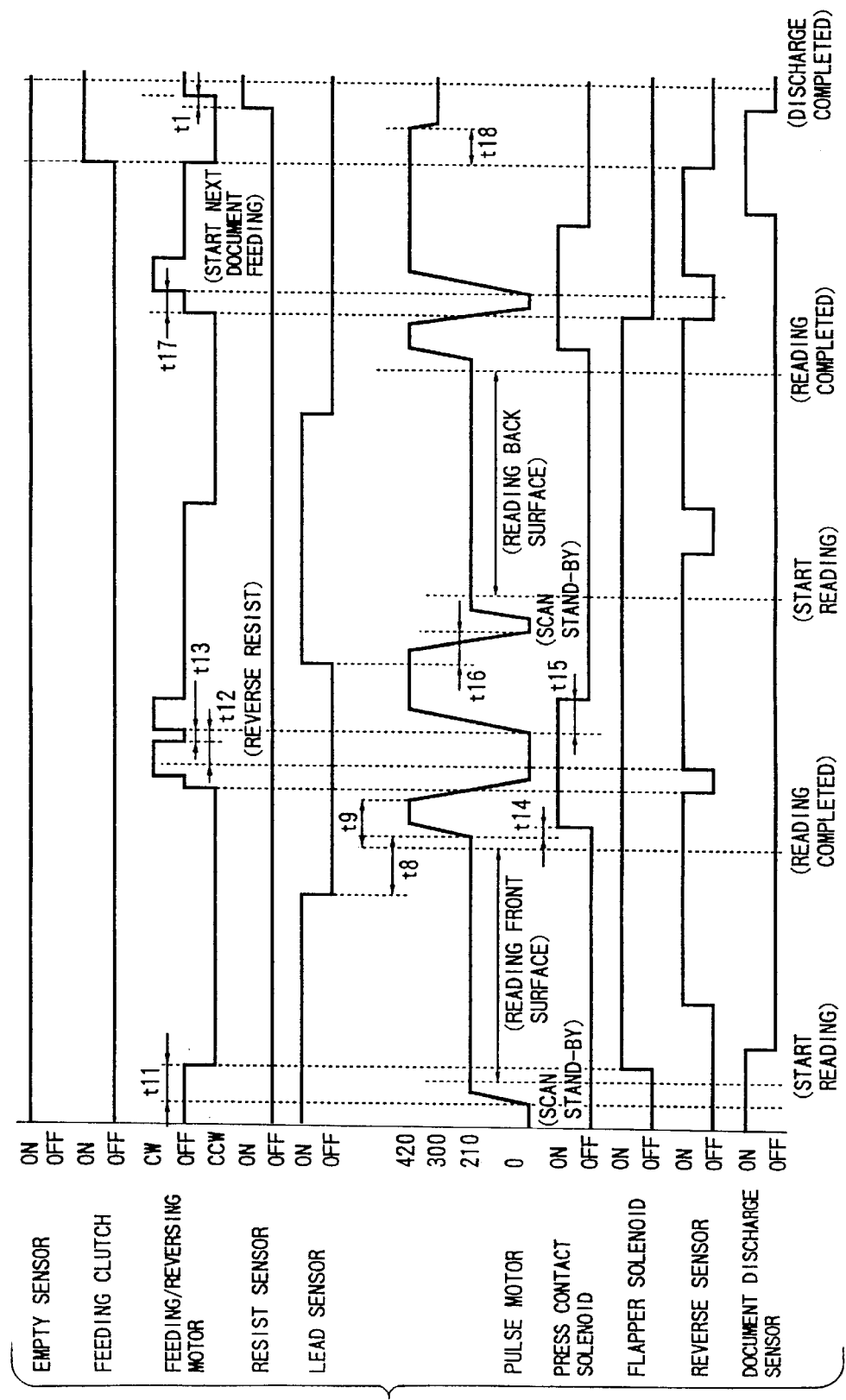
FIG. 8 is a timing chart for conveying and discharging the document, in double side reading in a normal mode.
Figure 10A:
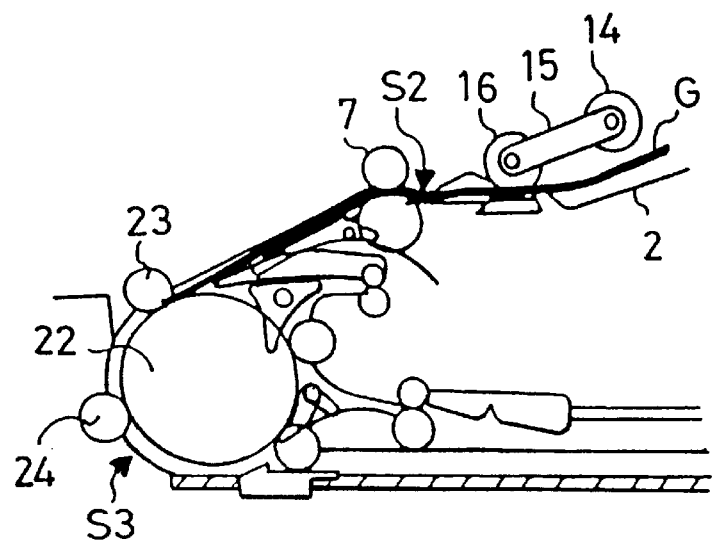
FIGS. 10(a)–10(c) are explanatory views showing the motion of the document in one side reading in a normal mode.
Figure 10B:
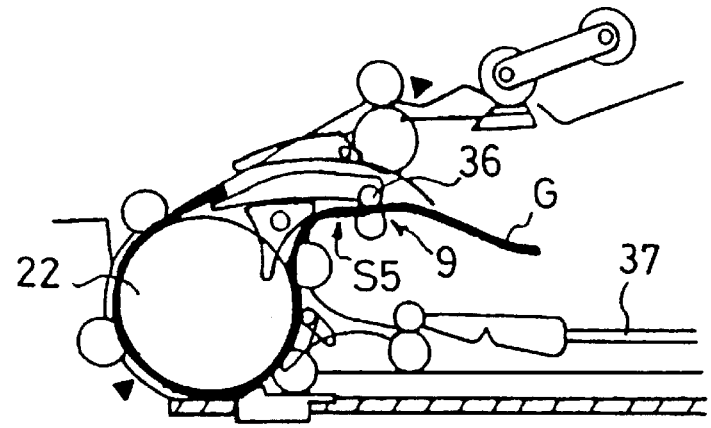
Figure 10C:
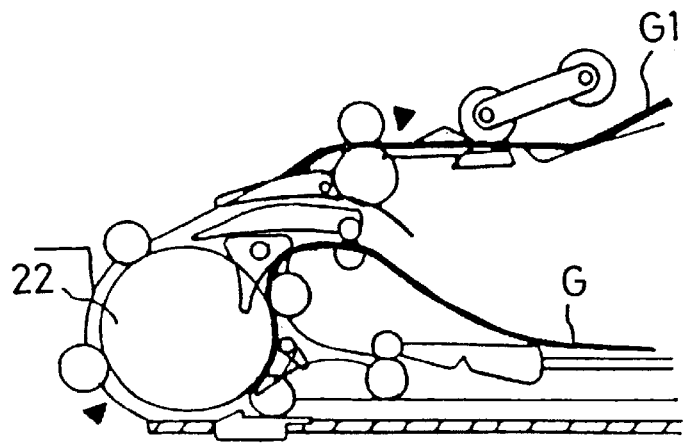

Firstly, there is explained one side reading in a normal mode where documents having same sizes are placed on the document tray 2, with reference to FIGS. 6, 7 and 8. As shown in FIGS. 6 and 10(*a*), upon setting a plurality of documents G the same sizes on the document tray 2, the document G. At the same time, the document size is immediately detected by the size detection sensor S1, and the document size is sent to the copy machine body H side and set in it. By turning on the starting button of the copy machine body H side, the feeding/reversing motor 18 and feeding clutch 17*a* are operated so that the arm 15 of the feeding roller 14 is swung, and the separation roller 16 and feeding roller 14 are rotated to thereby separatingly feed the uppermost one of those documents G set on the document tray 2.

After the leading edge of the document G is detected by the resist sensor S2, the rotation of separation roller 16 is stopped after a period of time t1, whereupon the leading edge of the document G is aligned by abutting the same to the resist roller 7. After standing by for a period of time t2 after the alignment by the resist roller 7, this roller 7 is rotated to feed the document G into the document feeding path 6. When the document G has reached a position just upstream of the conveying roller 22 after a period of time t3, the pulse motor 25 is forwardly rotated to rotate the conveying roller 22, thereby conveying the document G while nipping the same between the conveying roller 22 and the pinch rollers 23, 24. After a period of time t7 after the leading edge of the document G is detected by the lead sensor S3, the conveying roller 22 is stopped and thereafter stands by for scanning. As shown in FIG. 7, the pulse motor 25 is rotated again by the reading start signal from the copy machine body H, so that the conveying roller 22 is rotated again to start the reading of the front surface of document G. The rotational speed of the conveying roller 22 during the reading is controlled to be a reading speed slower than the conveyance speed before the reading. As shown in FIG. 10(*b*), when the leading edge portion of document G enters the document discharging portion 9, this leading edge portion is detected by the document discharge sensor S5, so that the document is discharged onto the discharge tray 37 by the document discharging rollers 36 which are driven to rotate by the pulse motor 25 in a manner similar to the conveying roller 22. As shown in FIG. 10(*c*), the feeding of the next document G1 is started during the reading of the preceding document. After a predetermined time after completion of the reading, the rotational speed of pulse motor 25 is increased to thereby discharge the document at a higher speed, and switched to a decreased speed discharge after a predetermined time t9, so as to complete the document discharge.

Figure 2:
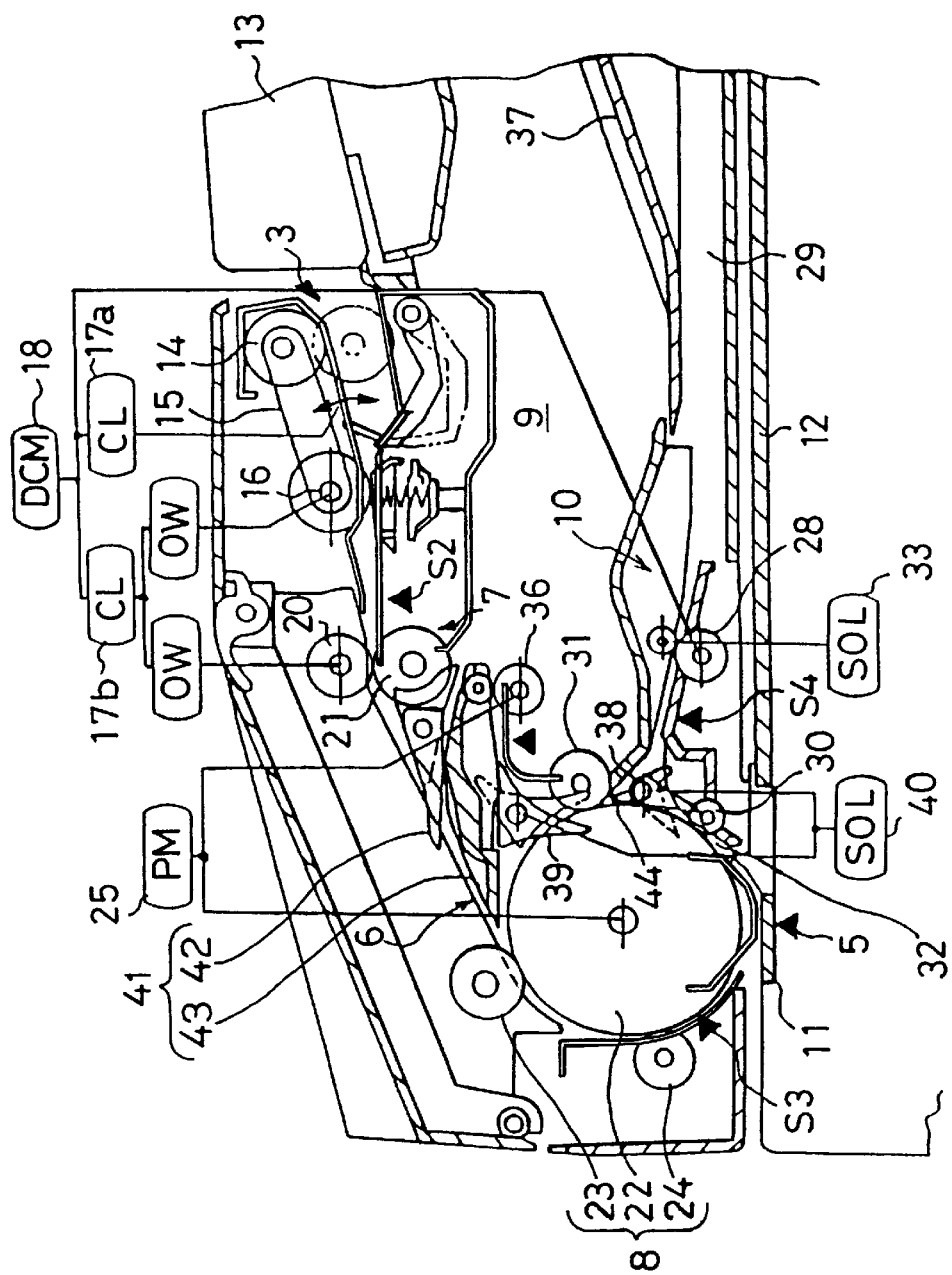
FIG. 2 is an enlarged view of an essential part of the automatic document feeder according to the present invention.
Figure 11A:
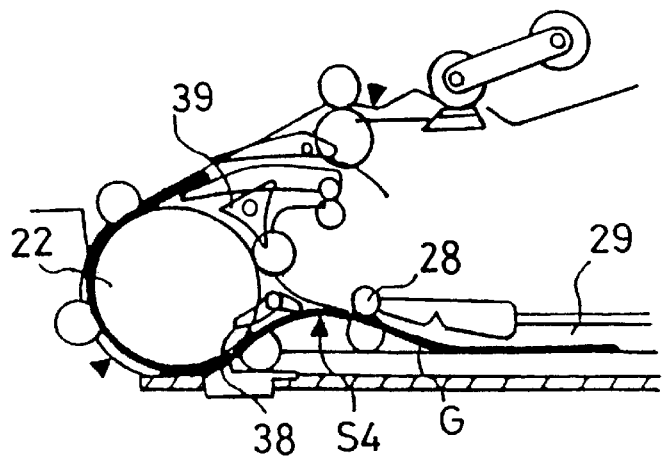
FIGS. 11(a)–11(c) are explanatory views showing the motion of the document in front surface reading in a double-side reading mode.
Figure 11B:
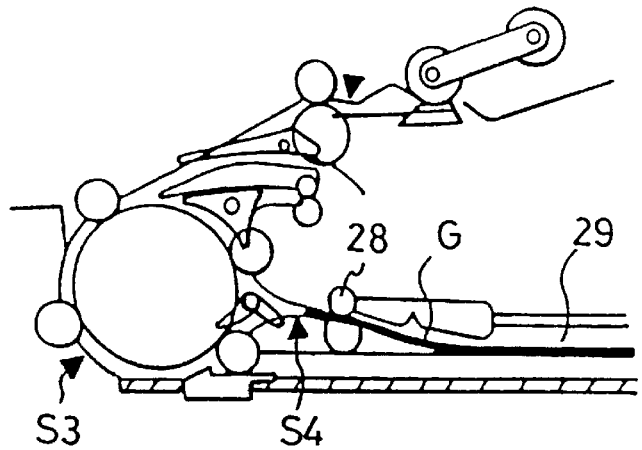
Figure 11C:
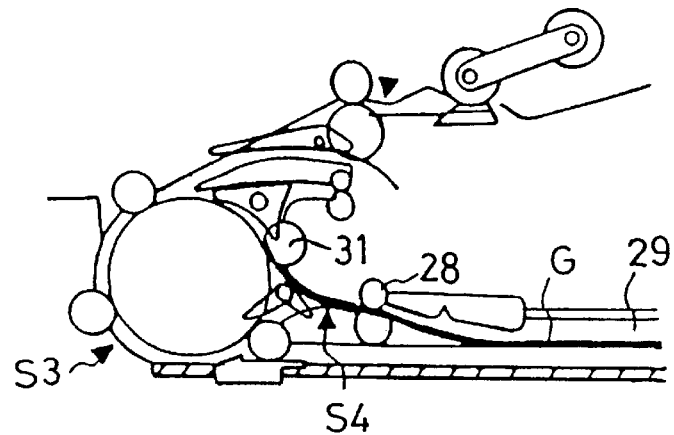
Figure 12A:
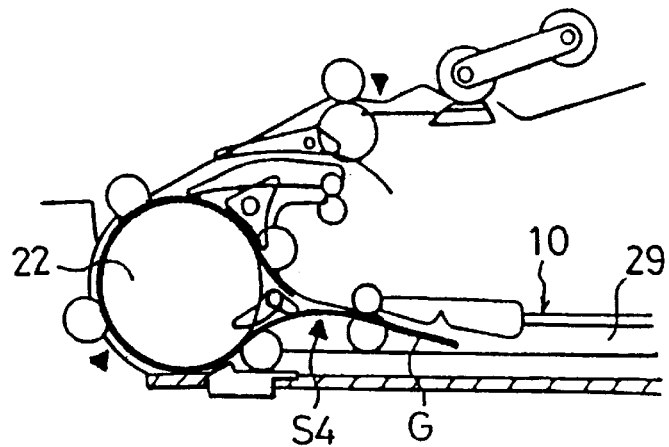
FIGS. 12(a)–12(c) are explanatory views showing the motion of the document in back surface reading in the double-side reading mode.
Figure 12B:
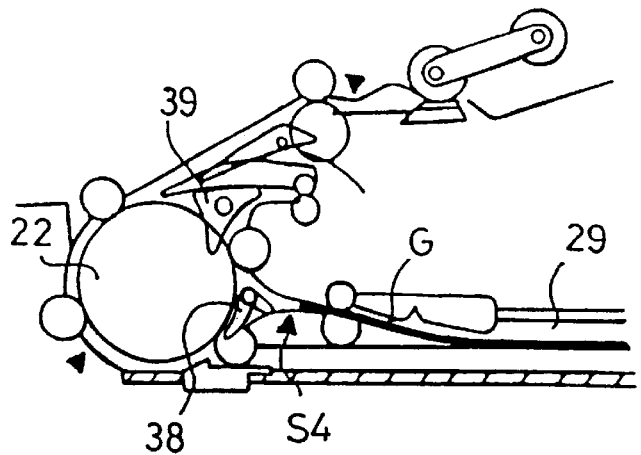
Figure 12C:
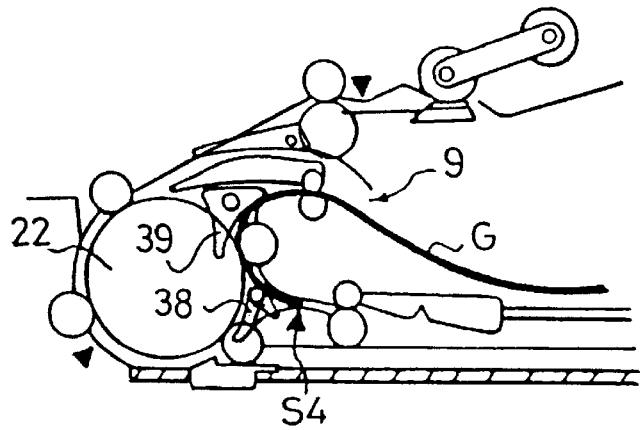

There will be explained next a double-side reading in the normal mode. In this case, there is conducted a control same with that shown in FIGS. 6 and 10(*a*), until the scan stand-by before reading the document is performed after the leading edge of the document G has been detected by the lead sensor S3 and then the conveying roller 22 is just stopped. As shown in FIGS. 8 and 11(*a*), after a period of time t11 from the starting of reading of document G, the feeding/reversing motor 18 drives the reversing rollers 28, and the solenoid 40 is turned on to switch both flappers 38, 39. thereby forming a path of the document reversing portion 10 side. When the leading edge side of the document G is conveyed into the switchback path 29 to enter the switchback path 29 by pushing up the control flapper 57, this is detected by the reverse sensor S4. As shown in FIG. 11(b), the document G, the front surface of which has been read, is wholly moved into the switchback path 29 at a high speed by the conveying roller 22 after a period of time t8 from the time of switching off of the lead sensor S3, resulting in that the rear edge of the document G becomes pinched between the reversing rollers 28. The reversing rollers 28 are then rotated in the reverse direction to switch back the document G, to thereby feed the same with treating its rear edge as a leading edge. At this time, the now leading edge of the document G abuts to a pressed contact area between the pinch roller 31 and conveying roller 22. the former 31 being arranged near the outlet, whereupon the reverse alignment is conducted for a period of time t13 as shown in FIG. 11(c). Further. as shown in FIG. 2, the now leading edge of document G is restricted by a guide 44 projectingly formed on the flapper 38, to thereby avoid contacting with the conveying roller 22, so that the alignment of the leading edge is never obstructed. Then, during a period of time t12 after detecting the leading edge of the document G by the reverse sensor S4, the leading edge of the document G is introduced to the outlet side by the control flapper 53 and the guide piece 54, and then abutted to the pressure contact position 50 between the pinch roller 31 and the conveying roller 22, thereby the alignment is carried out. After alignment, the conveying roller 22 is rotated at a high speed to rapidly convey the document G up to the reading position. After the leading edge of document G is detected by the lead sensor S3, the conveying roller 22 is stopped after a period of time t16 to stand by for scanning. The back surface(now front surface) of document G is read based on the reading start signal from the copy machine body H side, and the leading edge of document G is conveyed into the document reversing portion 10 again, as shown in FIG. 12(a). As shown in FlG. 12(b), the document is wholly conveyed into the switchback path 29 of the document reversing portion 10 by a repeated high-speed conveyance after completion of reading. Thereafter, the solenoid 40 is turned off to switch both of the flappers 38 and 39 thereby forming a path toward the document discharging portion 9, so that the document G, which has been turned back to front at the document reversing portion 10, is discharged at a high speed by the combination of the conveying roller 22 and document discharging rollers 36, onto the discharge tray 37 from a document discharge opening 34 to thereby complete the operation, as shown in FIG. 12(c). As shown in FIG. 5, the document reversing portion 10 and the document feeding portion 9 are connected to each other via a path of small radius of curvature, however, a conveying force is forcibly applied in the discharge direction by means of the pinch roller 31, therefore, a smooth discharge of the document can be effected without reduction of conveying force. As described above, in double side reading of documents G, the same are discharged after turning them back to front, so that the order of the documents G placed on the document tray 2 and the order of those discharged onto the discharge tray 37 can be corresponded to each other.

Figure 13A:
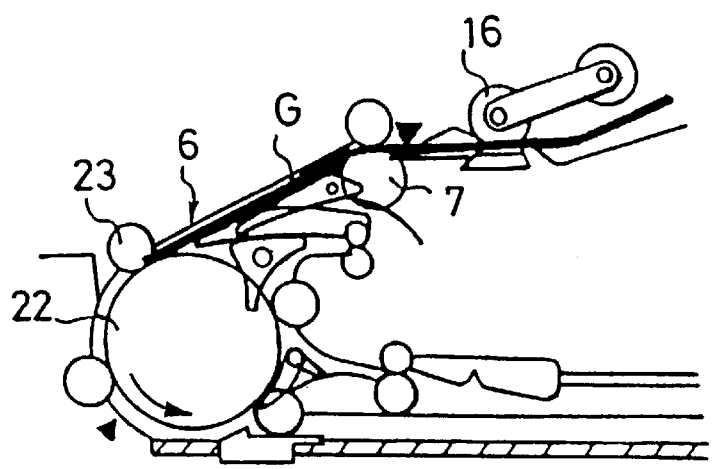
FIGS. 13(a)–13(c) are explanatory views showing the motion of the document in feeding of the document in the different-size mixed mode.
Figure 13B:
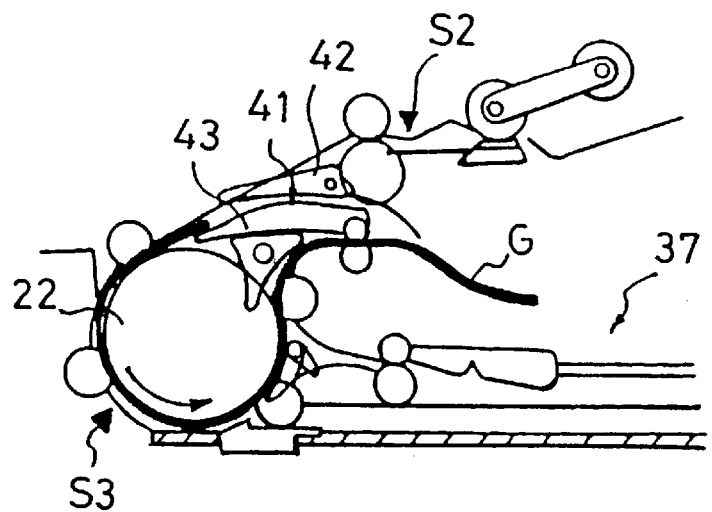
Figure 13C:
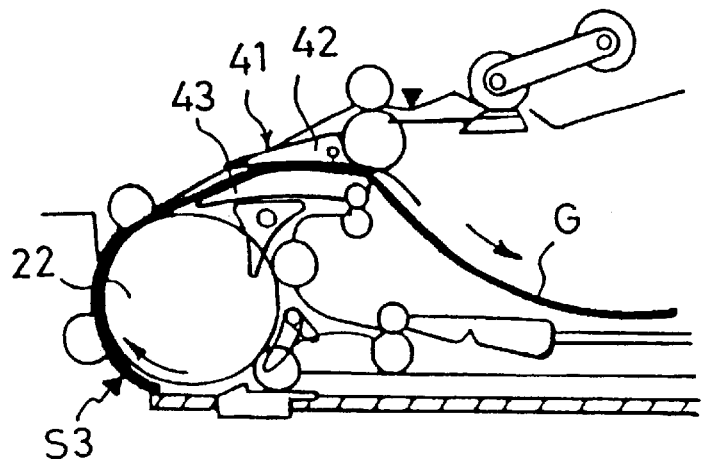

There will be described hereinafter the document reading in case of "different-size mixed mode" where different sizes of documents are placed on the document tray 2, with reference to FIGS. 9 and 13(a). Also in the different-size mixed mode, the document G placed on the document tray 2 are fed sheet by sheet by means of the separation roller 16, thereafter aligned by the resist roller 7, and conveyed toward the document reading portion by means of the conveying roller 22, same with the normal mode. Different from the normal mode the document size is not detected by means of the size detection sensor S1 disposed on the document tray 2. Namely, the aligned document G is passed over the document reading portion without stopping there, and the leading edge side of the document G is fed onto the discharge tray 37 as shown in FIG. 13(b). At this time, the document G is not read. In the course of passing of the document G over the document reading portion, the resist sensor S2 starts counting from the detection of the leading edge of document G up to the detection of its rear edge, and the length of document G is determined based on the counted number of times during such counting, which is informed to the copy machine body H side. Further, the rotation of conveying roller 22 is stopped after a period of time t4 after the rear edge of document G is detected by the resist sensor S2. At this time, the rear edge of document G is located at a position which has passed over the flapper 42 of the document shunting path 41, as shown in FIG. 13(b). Thereafter, by conveying the document G in the reverse direction by reversely rotating the conveying roller 22 at a high speed as shown in FIG. 13(c), the rear edge of document G is moved into the shunt path 41 with guided by the flapper 42. By reversely conveying the document G, the lead sensor S3 detects the leading edge of document G again, which means that the leading edge has reversely passed over the document reading portion 5, whereupon the conveying roller 22 is stopped. Then, the conveying roller 22 is forwardly rotated to thereby feed the document G, and the stand-by is conducted after detecting the leading edge of document G by the lead sensor S3. The conveying roller 22 is then forwardly rotated by obtaining the reading start signal from the copy machine body H side, to thereby read the document G. The operation thereafter, i.e., from the reading of document G up to the discharge thereof onto the discharge tray 37, is conducted in a manner same with the aforementioned one side reading in the normal mode shown in FIGS. 10(b) and 10(c). Meanwhile, there is omitted a detailed explanation about the motion of document G after the state shown in FIG. 13(c) in the double-side reading where the document G is conveyed into the document reversing portion 10, since such operation is identical with that of the double side reading in the normal mode as shown in FIGS. 11 and 12(a) through 12(f). Even in case of the different-size mixed mode if the rear edge of the document G is detected by the resist sensor S2 before the leading edge is detected by the lead sensor S3 on the upstream side of the document reading portion, the reading of document is performed based on the as-conveyed document G in a manner similar to the normal mode, without shunting the document G into the document shunting path 41.

As described above, the document shunting path is formed in the document feeding path and in the different-size mixed mode, the length of the document is detected using this document shunting path, thus, there is no necessity to provide a long document feeding path as in the conventional way, to thereby achieve the minimization of the document feeder.

Further, the document conveyance path is disposed between the document feeding portion and the document discharging portion positioned at the downstream side of the document feeding portion, and branched into two paths so that a space over the discharge tray can be used as the document shunting path and the further minimization of the document feeder can be achieved, in addition, the constitution of the document feeder can be simplified.

As described above, there is disposed the pinch roller for conveying the document with pressure contact with the conveying roller to near the outlet of the document reversion portion, and the switchbacked document in the document reverse portion is fed by means of the conveyance force of the pinch roller to the document reading portion or the document discharging portion, so that the path structure and feeding mechanism can be simplified and the minimization of the automatic document feeder itself can be minimized.

Further, the conveyance force is forcibly applied by the pinch roller, even if the radius of curvature of the document discharge path is made small, a sufficient document conveyance force can be obtained.

Moreover, since the leading edge of the document fed from the document reversing portion to the document reading portion is abutted to the pressure contact position with the conveying roller to thereby be abutted, the alignment of the leading edge of the document can be ensured without an influence of the conveying roller.

Still further, there is provided the guide means for introducing the leading edge of the document fed from the document reversing portion into the pressure contact position between the conveying roller and the pinch roller, thereby enabling the smooth alignment.

Figure 14:
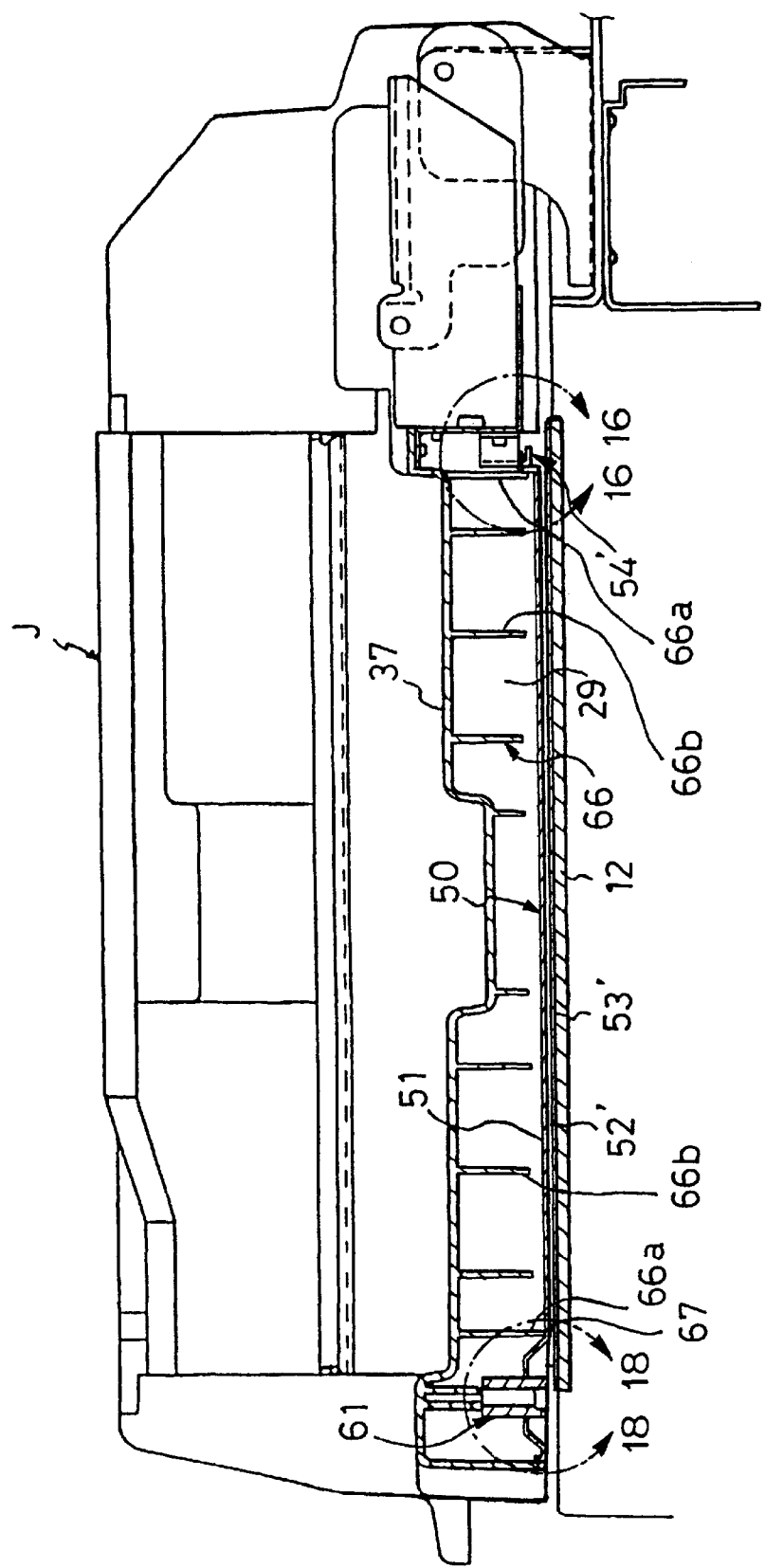
FIG. 14 is a sectional view of an internal structure of the document reversing portion.
Figure 15:
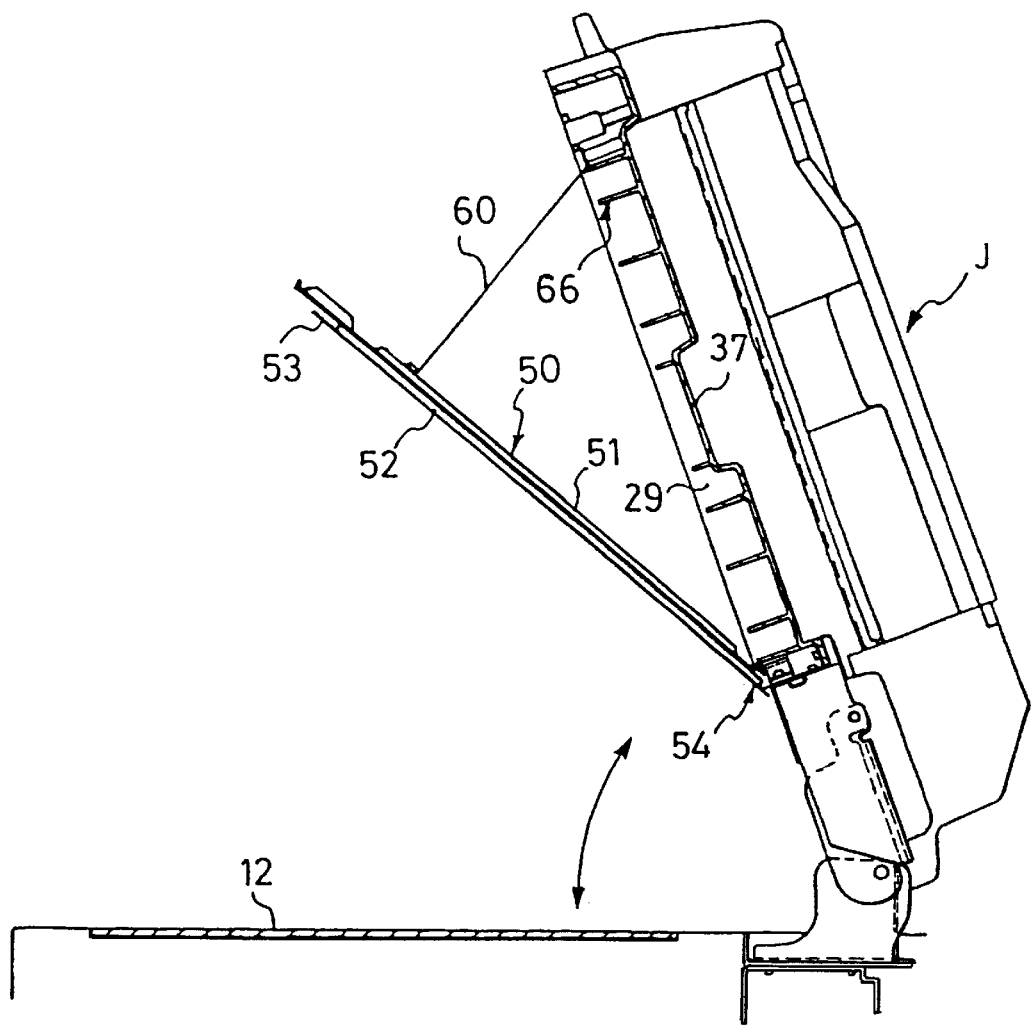
FIG. 15 is a sectional view of a state when a platen cover is opened.

The switchback path 29 of the document reversing portion 10, as shown in FIGS. 14 and 15, is constructed by using a sealed space formed between the lower surface of the discharge tray 37 and the upper surface of a platen cover 50 for covering the platen 12. The platen cover 50 has a three layer construction of a thin aluminum plate 51 having rigidity, a sponge material 52' adhered to the lower surface of the plate 51 and a soft film 53' covering the lower surface of the sponge material 52'. The platen cover 50 is rotatably supported to the automatic document feeder body J at the inner side of the switchback path 29 to have the switchback path 29 to be able to open and close. The open and close direction of the switchback path 29 is same as that of the automatic document feeder body J with respect to the copy machine body H, and typically, the front operation panel side of the copy machine body H is constructed to open and close.

Figure 16:
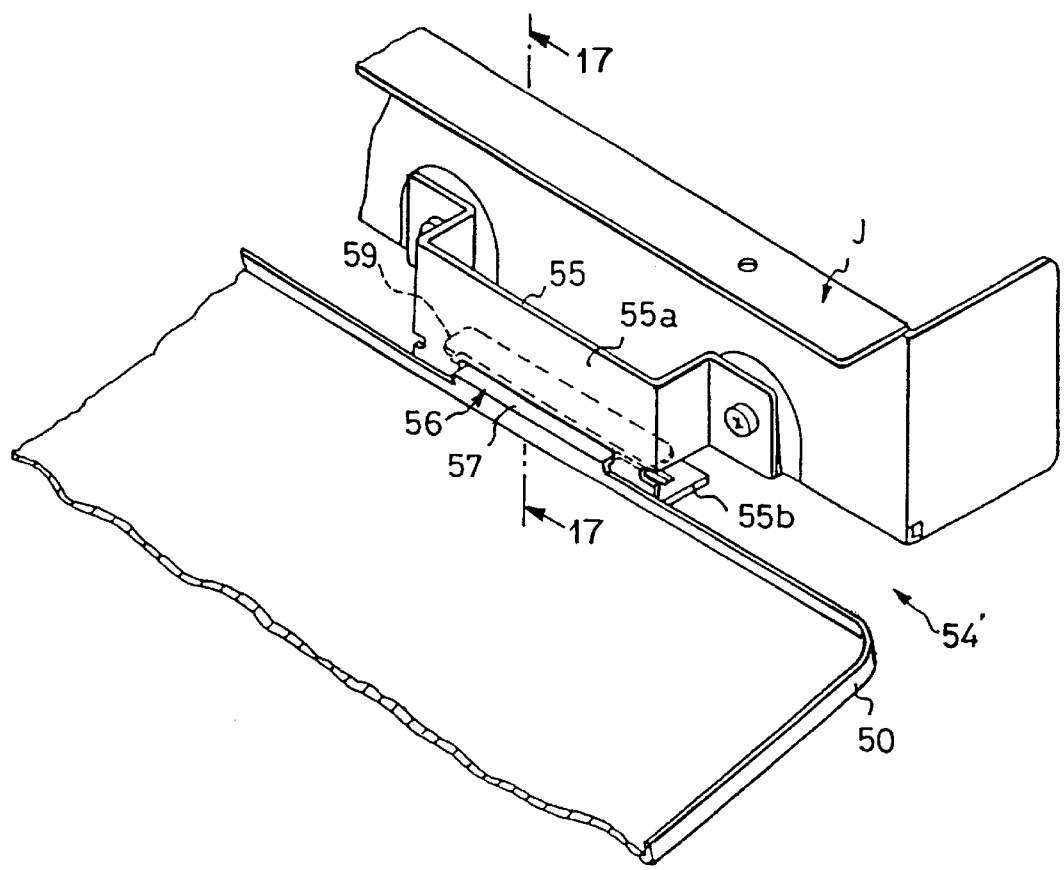
FIG. 16 is an enlarged perspective view of circled portion A in FIG. 14.
Figure 17:
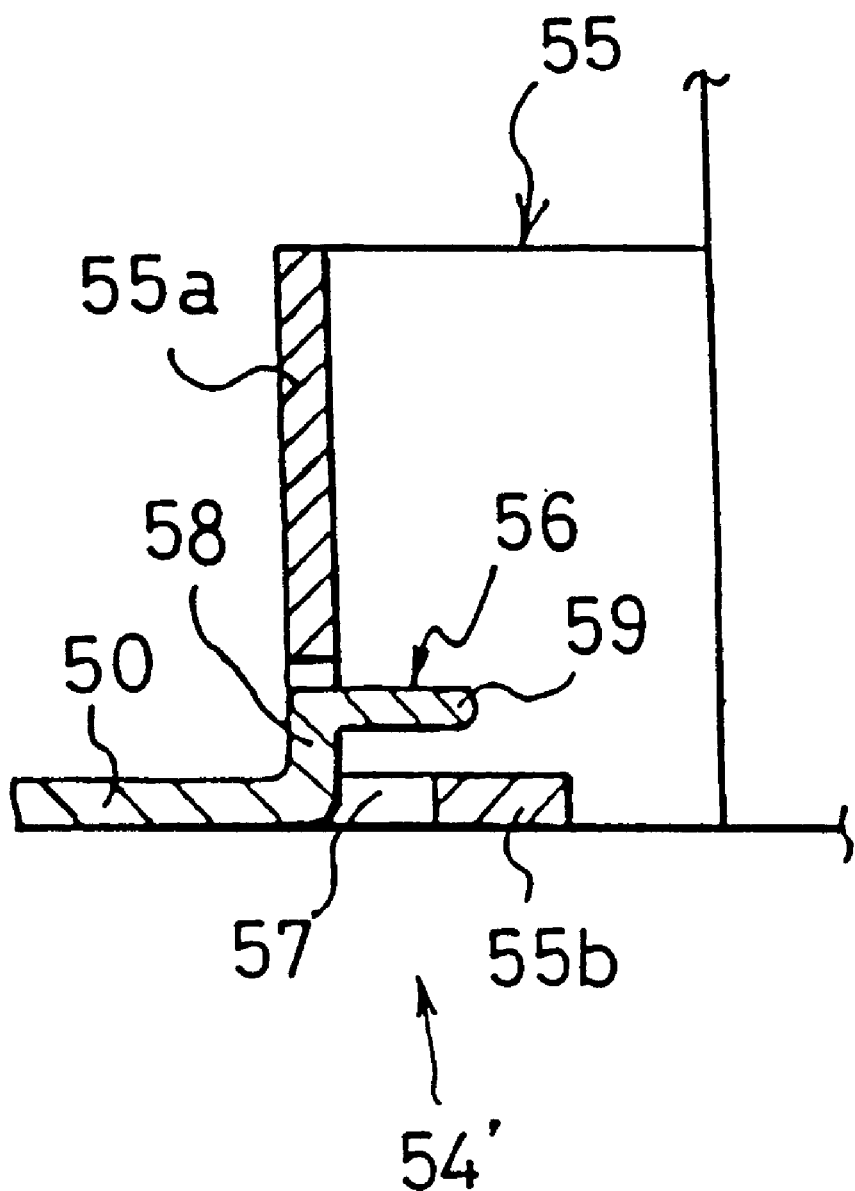
FIG. 17 is a sectional view along 17—17 of FIG. 16.

The above platen cover 50, as shown in FIGS. 16 and 17, is attached rotatably by means of a hinge 54'. The hinge 54' comprises a U-shaped bracket 55 secured to the automatic document feeder body J and a fitting member 56 secured to the rear end of the platen cover 50. The bracket 55 has a front wall 55a and a lower wall 55b bending to the lower side of the front wall 55a, and a fitting hole 57 is formed on the corner portions of both of the walls so as to be across the walls. On the other hand, the fitting member 56 comprises a vertical wall fitting into the fitting hole 57 and a fitting tongue 59 extending horizontally from the upper end of the vertical wall 58. The fitting tongue 59 is formed so as to be wider than the fitting hole 57 of the bracket 55 and engages with both side edges of the fitting hole 57 to prevent the removal of the fitting member 56. Further, the fitting member 56 is fitted within the fitting hole 57 with a backlash in upper and lower directions so that the platen cover 50 can move in the upper and lower directions.

Figure 18:
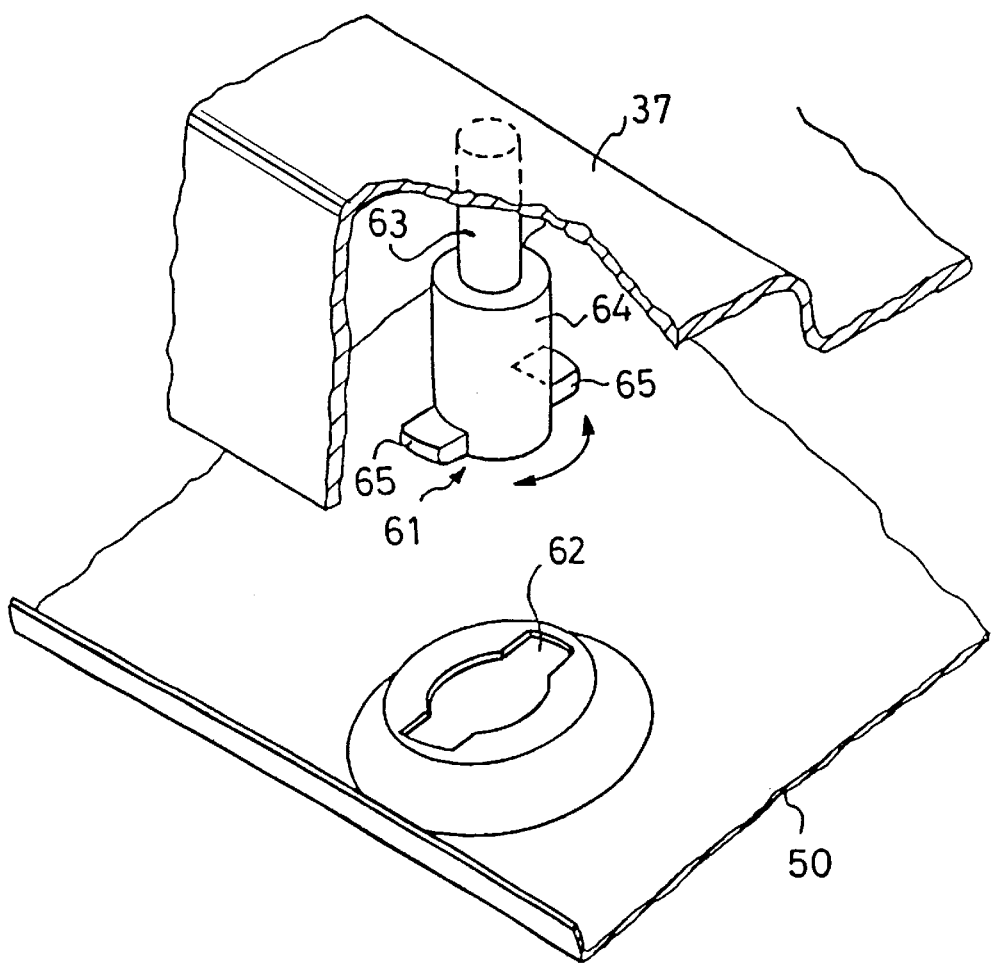
FIG. 18 is an enlarged perspective view of circled portion C in FIG. 14.

On the front end side of the platen cover 50 opposite to the above hinge 54', a strap or belt 60 is stretched to the automatic document feeder body J to control the opening degree of the platen cover 50. Further, provided near the belt 60 is a locking mechanism for opening and closing the platen cover 50. As shown in FIG. 18, this locking mechanism comprises a key member provided on the side of the automatic document feeder body J and a key hole 62 formed on the side of the platen cover 50. The key member 61 is composed of a supporting shaft 63 projecting downwardly and a cylindrical thumb nut 64 rotatably provided on the supporting shaft 63. A fitting piece 65 to be engaged with the key hole 62 is provided at the lower end of the thumb nut 64 so as to project out of both sides of the thumb nut 64. The opening and closing of the platen cover 50 can be easily effected only by aligning the fitting piece 65 with the key hole 62 to rotate the thumb nut 64 by 90°. Further, similarly as described above, the thumb nut 64 is fitted within the key hole 62 with a backlash in upper and lower directions so that the platen cover 50 can move in the upper and lower directions.

Within the above switchback path 29, ribs 66 for extending from the lower surface of the discharge tray 37 into the switchback path 29 are provided. The ribs 66 are disposed at equal spaces along the front and rear direction of the automatic document feeder body J to serve as a guide when the document is introduced into the switchback path 29. At the same time, the platen cover 50 is prevented from being deformed due to deflection by pressing down uniformly the platen cover 50 by means of the tips of the ribs 66 when for example, a book is put on the platen 12 and covered by the platen cover 50. Further, ribs 66a on the both sides are formed so that a space 67 between the upper surface of the platen cover 50 is narrower than that between other ribs 66b, thereby controlling a degree of backlash in the upper and lower directions of the platen cover 50.

As described above, a part of the document conveyance path is formed within a space region formed by the document discharging portion and the document cover member, and the document cover member is mounted so as to freely open and close with respect to the document discharging portion. Thus, when a jam of the document occurs in the document conveyance path, the document cover member is opened to easily remove the jammed document from the document conveyance path.

Moreover, since the open and close direction of the document cover member is the same as that of the automatic document feeder body with respect to the platen, the open and close operation of the document cover member can be effected from the front surface side of the operation panel, thus the treatment is extremely easy.

The document cover member has a three layer construction having a plate member with rigidity, a foaming member attached to this plate member and a soft film member attached to this foaming member, and is mounted with a backlash in the upper and lower directions with respect to the document discharging portion, thereby improving the tightness to the platen.

Since the conveyance guide projecting out of the document discharging portion is provided in the document conveyance path, the document is conveyed along the guide to restrain the occurrence of jam and also uniformly press down the document cover member.

Figure 19:
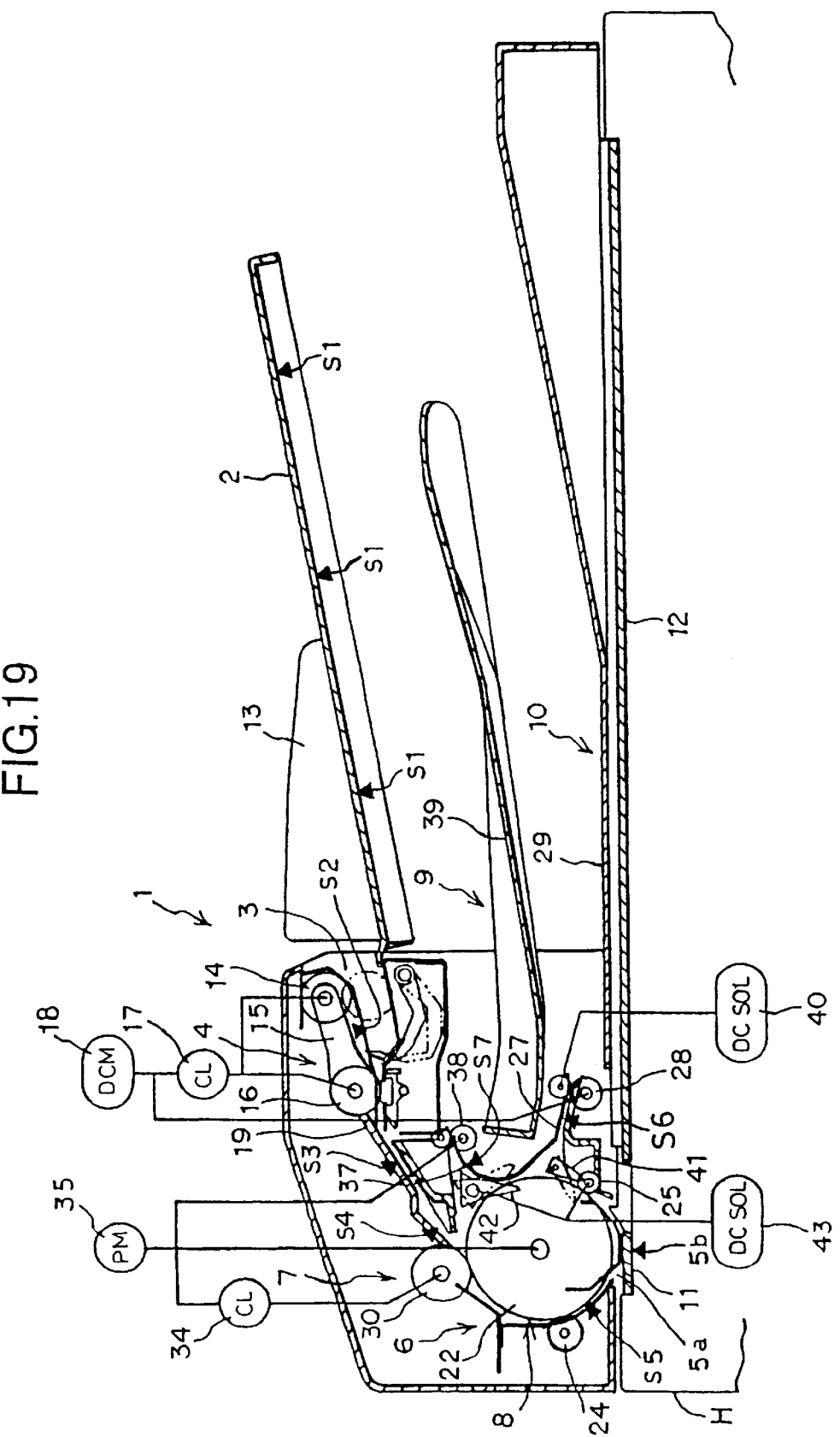
FIG. 19 is a schematic sectional view of another automatic document feeder according to the present invention.

Next, another embodiment will be described hereinafter. FIG. 19 shows a schematic sectional view of an automatic document feeder according to this embodiment. In the drawings, reference numeral 1 designates an automatic document feeder according to the present invention, which comprises: a document tray 2 for placing the documents thereon; document picking-up means 4 arranged adjacent to a document feeding opening 3; a document feeding path 6 extending from the document feeding opening 3 up to a document reading portion 5b which faces to document reading means 5a of a copy machine body H; a resist portion 7 provided on the way of the document feeding path 6 to thereby align the leading edge of the document; a conveying portion 8 for conveying the aligned document to the document reading portion 5b; a document discharging portion 9 for discharging the document read by the, document reading means 5a; and document reversing portion 10 provided between the document reading portion 5b and the document discharging portion 9. Each of the documents placed on the document tray 2 is fed sheet by sheet to the document reading portion, and the document is discharged to the document discharging portion 9 after its front surface is read; or switched back at the document reversing portion 10 after its front surface is read, and again fed to the document reading portion 5b by the conveying portion 8 to thereby read the back surface of the document.

The copy machine body H is provided with: a transparent glass 11 used for reading the image on the document by the document reading means 5a when the document is automatically fed; and a platen 12 used for reading a document such as book by having the document reading means 5a scan move.

The document tray 2 is arranged obliquely toward the document feeding opening 3 of the feeder body, and is provided with a guide plate 13 moveable in the width direction of the documents. This guide plate 13 is to detect the width of the document, and is connected to a variable resister via a rack and a pinion gear to detect the width of the document based on a resistance value when the guide plate 13 moves. The width of documents is detected by the position of this guide plate 13. Further, the document tray 2 is provided with three size detection sensors S1 for detecting the length of the document in the feeding direction. These size detection sensors S1 are constituted such as of limit switch or optical sensor, and the size detection is performed by combination of the guide plate 13 with the size detection sensors S1.

The document picking-up means 4 is arranged near the document feeding opening 3, and comprises: a feeding roller 14 serving as feeding means displaceable in the thickness direction of the documents placed on the document tray 2; an arm 15 for rotatably supporting the feeding roller 14; and a separation roller 16 positioned at the other end of the arm 15. The feeding roller 14 is normally held in a stand-by position, and moved from the stand-by position toward a feeding position by the operation of a feeding clutch 17, whereafter the roller 14 is rotated by following the rotation of separation roller 16 to thereby feed the documents on the document tray 2 sheet by sheet. There is rotated the separation roller 16 via feeding clutch 17 which operates upon reverse rotation of a DC motor (a feeding/reversing motor) 18, so that the documents are separated between separation pats sheet by sheet and thereafter fed to the document feeding path 6.

An empty sensor S2 is provided between the feeding roller 14 and the separation roller 16 to detect the presence or absence of the document on the document tray 1.

Figure 20:
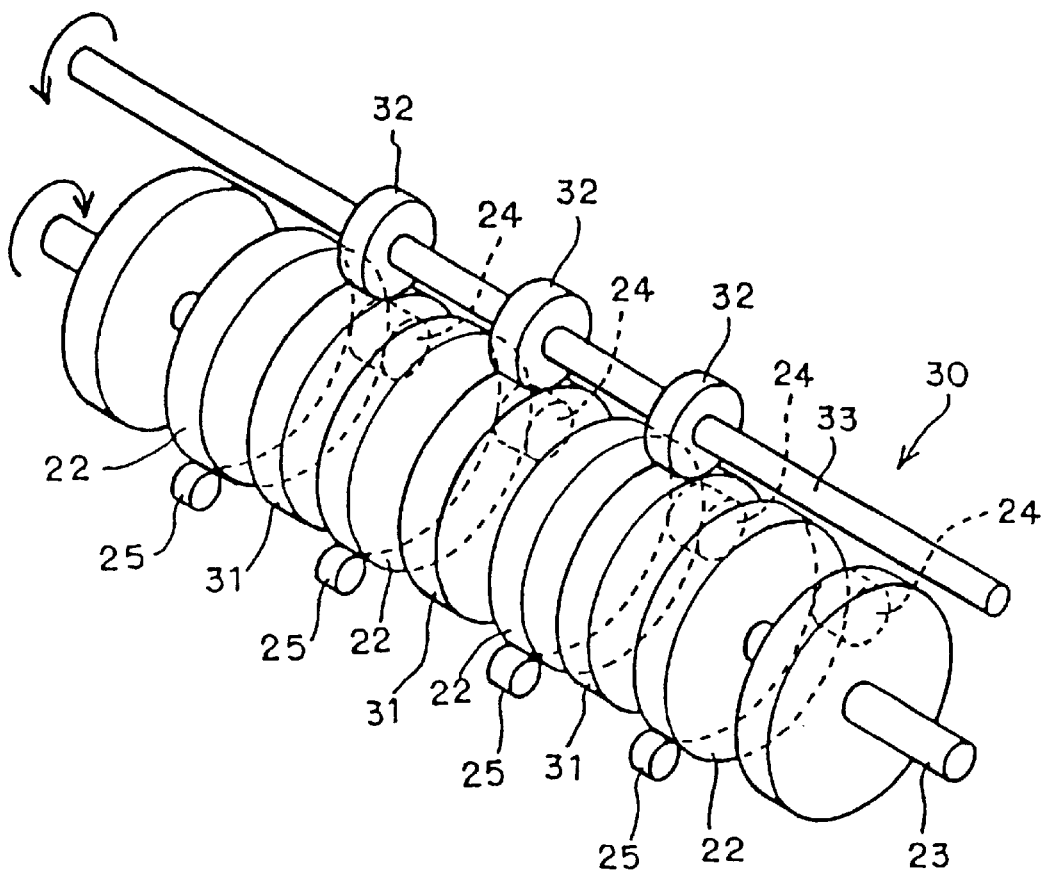
FIG. 20 is a perspective view of a resist portion of the automatic document feeder in FIG. 19.

Provided on the downstream side of the above separation roller 16 is a document feeding path 19 downwardly inclining toward a conveying roller 22, and a separation sensor S3 and a resist sensor S4 are also provided in sequence. Near the downstream side of the resist sensor S4, there is provided a resist roller 30 for effecting the alignment of the document on the periphery of the conveying roller 22 serving as conveying means. As shown in FIG. 20. this resist roller 30 comprises a driven roller made of resin disposed on the same shaft of a drive shaft 23 of the conveying roller 22 and a driving shaft 32 which is in pressure contact with the driven roller 31. The driven roller 31 is disposed between each of the conveying rollers 22 arranged along the drive shaft 23 and is formed in the substantially same size as the conveying roller 22. Thus the driving roller 31 is in pressure contact with the driven roller 31 on the substantially same surface as the periphery of the conveying roller 22. A drive shaft 33 of the driving roller 32 is controlled by a pulse motor (conveyance motor) 35 via a resist clutch 34, and also controlled of its rotation by means of on/off of the resist clutch 34. The driven roller 31 is supported to the drive shaft 23 of the conveying roller 22 so as to be able to freely rotate and the driving roller 32 is also adapted to freely rotate when the resist clutch 34 is off. However, since the driving roller 34 applies a friction by means of a spring force, the driving roller 32 does not slip when the leading edge of the document abuts the resist roller 30 under a state that the clutch 34 is off, and when the resist clutch is turned on after alignment of the document, the driving roller 32 rotates to send the document to the conveying roller 22 while nipping the document between the driven roller 31. Thus, the resist roller 30 and the conveying roller 22 are controlled separately to each other, therefore, the rotation of the conveying roller 22 does not influence on the alignment of the document at the time of alignment.

Disposed on the downstream side of the resist roller 30 is the conveying portion 8 comprises the above conveying roller 22 for conveying the document while winding thereon, and auxiliary rollers 24, 25 arranged on the periphery of the conveying roller 22. In the conveying portion 8, the document is gripped between the conveying roller 22 and the auxiliary rollers 24, 25, and fed to the document reading portion 5b which is opposed to the document reading means 5a.

There is disposed a document reading sensor S5 on the upstream side of the document reading portion 5b. This document reading sensor S5 is a leading edge detecting sensor for stopping the conveyance of document before reading the document. The forward conveyance of the document is resumed based on the reading start signal supplied from the copy machine body H. The reading of document is performed by the document reading means 5 when the document passes over the surface of the transparent glass 11.

The document reversing portion 10 is positioned downstream of the document reading portion, and comprises: an introducing guide 27 with an opening thereof being flared; and a pair of reversing rollers 28 disposed near the guide 27; and a switchback path 29 provided at the rear side of the rollers 28. The reversing rollers 28 are opened and closed by a DC solenoid 40, and are adapted to rotate in the forward and reverse directions by means of the DC motor 18, so that the document is reversely fed after switching back the conveyance direction of the document from its leading edge to its rear edge by the forward rotation and reverse rotation of the reversing rollers 28. There is disposed a reverse/discharge sensor S4 near the reversing rollers 28.

The document discharging portion 9 is disposed under the document tray 2, and comprises: a discharge guide 37 which bendingly extends from the document discharging portion 10; a pair of document discharging rollers 38 provided on the way of the guide 37; and a discharge tray 39 on the rear side of the rollers 38. The document discharging rollers 38 are adapted to rotate in the forward and reverse directions by means of the pulse motor 25. Disposed near the document discharging rollers 38 is a document discharge sensor S7 for detecting the discharge of document.

There are provided a flapper 41 near the inlet of the document reversing portion 10, and a flapper 42 near the inlet of the document discharging portion 9, respectively, for switching the conveyance direction of the document. The switching of these flappers 41 and 42 can be effected by means of the DC solenoid 43, such that the first flapper 41 switches the document conveyed from the document reading portion 5b to the document reversing portion 10, and the second flapper 42 switches the document between toward the document discharging portion 9 and toward a path extending to the document reading portion 5b.

Figure 21:
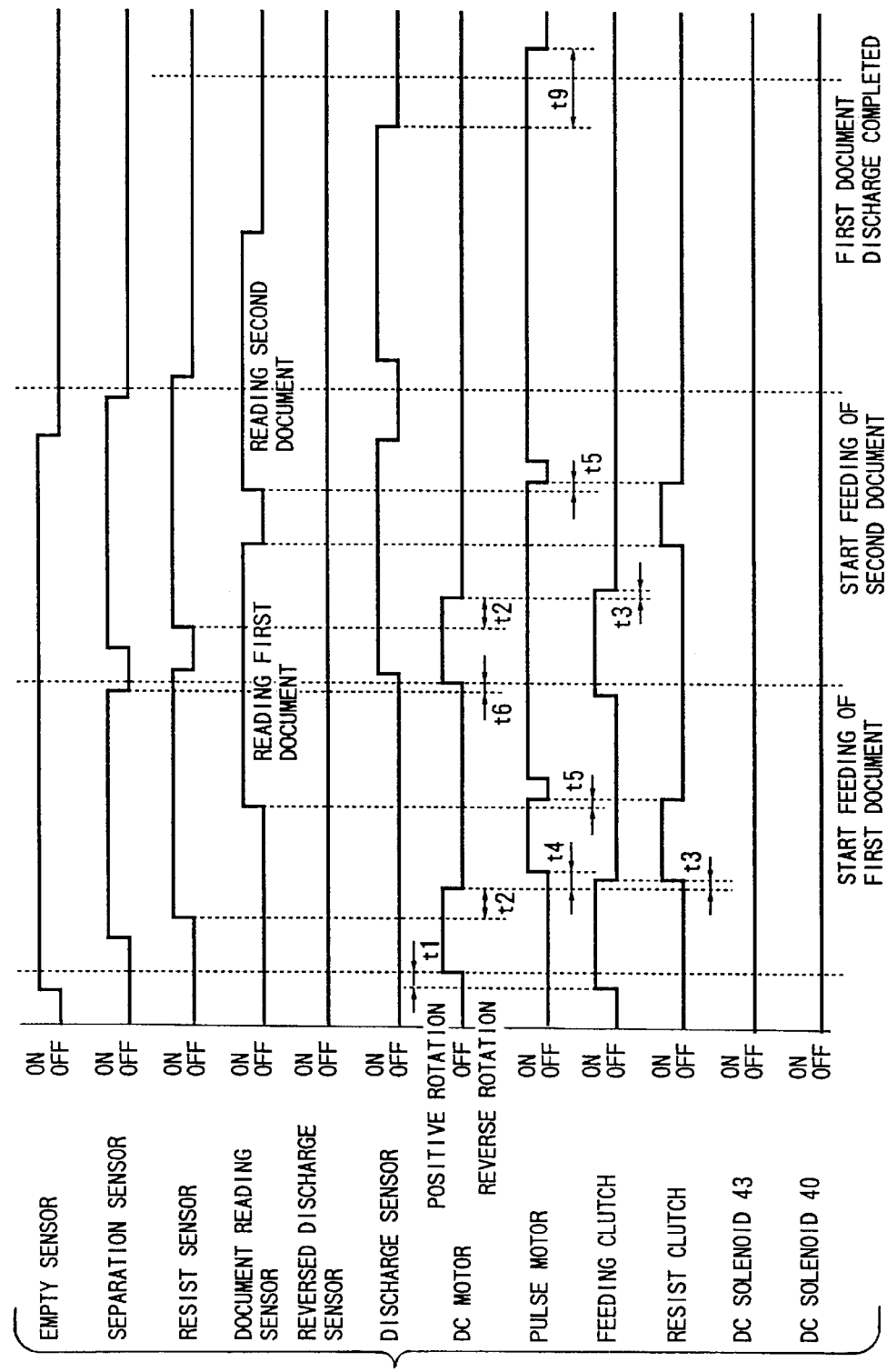
FIG. 21 is a timing chart in a one-side reading mode.

Next, there will be explained operations of the automatic document feeder of the above constitution. FIG. 21 shows a timing chart in one side reading mode. First, upon setting documents on the document tray 2, the empty sensor S2 is turned on to detect the documents. The document size is immediately detected based on the size of the conveyance direction detected by the size detecting sensor S1 and the size of the width direction detected from a variation of the variable volume, and then a signal indicating the document size is sent to the copy machine body H side. Upon turning on the starting button of the copy machine body H side, the feeding clutch 17 is operated and after a period of time t1, the DC motor 18 is rotated forwardly. By means of the forward rotation of the DC motor 18, an arm 15 of the feeding roller 14 is rotated and the separation roller 16 and the feeding roller 14 are rotated to thereby separatingly feed the uppermost one of the documents set on the document tray 2.

At the same time when the leading edge of the document is detected by the separation sensor S3 and the resist sensor S4 due to the document feeding, and the rotation of the DC motor 18 is stopped after a period of time t2 from the detection by the resist sensor S4 to thereby stop the document feeding, the leading edge of the document abuts the resist roller 30 to be aligned. The resist clutch 34 is turned on after a period of time t3 from the stop of the rotation of the DC motor 18 and the nipping conveyance by the resist roller 30 is started. The pulse motor 35 starts rotation after a period of time t4 from the stop of the rotation of the DC motor 18 and the document sent from the resist roller 30 is conveyed by the conveying roller 22 and the auxiliary roller 24.

After the pulse motor 35 and the resist clutch 34 are stopped after a period of time t5 from when the leading edge of the document is detected by the document reading sensor S5, the document conveyance is stopped, and thereafter stands by for reading. The pulse motor 35 is rotated again based on a reading start signal from the copy machine body H so that the conveying roller 22 is rotated to send the document to the document reading portion 5b, thereby starting the reading of the front surface of the document.

At the same time when the separation sensor S3 detects the rear edge of the document during the reading of the first sheet, the feeding clutch 17 is turned on and the DC motor 18 starts rotation after a period of time t6. As in the first sheet, the art 15 of the feeding roller 14 is rotated by the forward rotation of the DC motor 18 and the separation roller 16 and the feeding roller 14 are rotated to thereby separatingly feed the uppermost one (the second sheet) of the documents set on the document tray 2. As in the conveyance of the first sheet, the leading edge of the document is detected by the separation sensor S3 and the resist sensor S4 due to the document feeding, and the rotation of the DC motor 18 is stopped after a period of time t2 from the detection by the resist sensor S4. The feeding clutch is stopped after a period of time t3 from the stop of the rotation of the DC motor 18 and the leading edge of the document abuts the resist roller 30 to be aligned.

At the same time when the document reading sensor S5 detects the rear edge of the first sheet, the resist clutch 34 is turned on and the second sheet is sent by the resist roller 30. The conveying roller 22 is controlled separately from the resist roller 30 and, when the second sheet is aligned, continues the rotation to effect the reading conveyance. Therefore, even when the reading is completed, continuously, the second sheet is conveyed by the conveying roller 22 Thus, the second sheet is aligned during the first sheet is read and conveyed, and simultaneously with the completion of the first sheet reading conveyance, the second sheet is conveyed by the conveying roller 22, thereby improving the reduction of processing time without conveyance loss between the documents.

The pulse motor 35 and the resist clutch 34 are turned off after a period of time t5 from when the leading edge of the second sheet is detected by the document reading sensor S5 to thereby have the second sheet stand by. During the second sheet is read after the pulse motor 35 is driven again, the rear edge of the first sheet is detected by the document discharge sensor S7 to be discharged to the document discharging portion 9. During the reading of the second sheet, in the same control as in the above, the third sheet is fed from the document tray 2 and conveyed to the document reading portion 5b. However, if it is judged that the second sheet is a final sheet due to the off of the empty sensor S2, as shown in FIG. 21, the leading edge detection and the rear edge detection by the document discharge sensor S7 are effected and the pulse motor 35 is turned off after a period of time t9 from the detection of rear edge to thereby complete a sequence of automatic document feeding after the second sheet is discharged.

Figure 22:
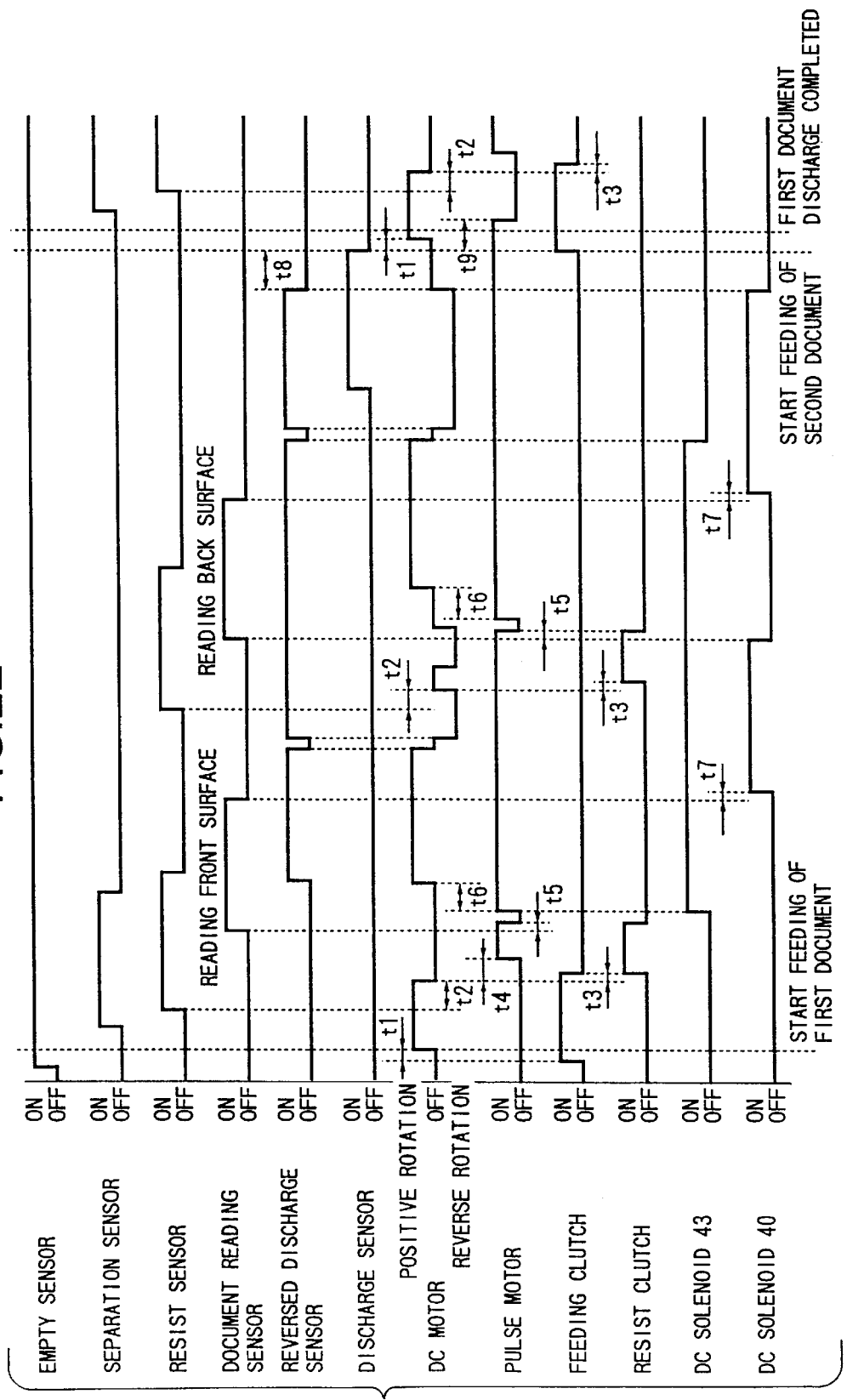
FIG. 22 is a timing chart in a double-side reading mode.

There will be explained next a timing chart of a double-side reading of the document with reference to FIG. 22. In this case, there is conducted a control same with that of the one side reading shown in FIG. 21, until the leading edge of the document is detected by the document reading sensor S3. Then, when a reading start signal is sent from the copy machine body H during standing by, the pulse motor 35 is driven and the conveying roller 22 is rotated, thereby starting the reading of the front surface of the document. Simultaneous with the driving of the pulse motor 35, the DC solenoid is turned on to switch the flappers 41, 42 to the reverse side. Also, the DC motor 18 is forwardly driven after a period of time t6 from when the pulse motor 35 is driven, and at the same, the reverse/discharge sensor S6 of the document reversing portion 10 detects the leading edge of the document to send the document to the document reversing portion 10.

When the rear edge of the document is detected by the document reading sensor S5, after a period of time t7 the DC solenoid 40 is operated to press down the reversing rollers 28 for a predetermined time. Then, when the reverse/discharge sensor S6 detects the rear edge of the document and the document is shunted to the switchback path 29 except for a portion pinched between the reversing rollers 28, the DC motor 18 is reversely rotated to rotate the reversing rollers 28 in the reverse direction with the reversing rollers 28 being pressed down, thereby sending the reversed document from the switchback path 29 to the resist portion 7. When the resist sensor S4 detects the leading edge of the document as a result of the reverse conveyance of the document, after a period of time t2 the rotation of the DC motor 18 is stopped and the alignment of the leading edge is effected by the resist roller 30. Then, after a period of time t3, the resist clutch 34 is operated to send the document to the conveying roller 22.

When the leading edge of the document is detected by the document reading sensor S5, as in the case of the reading of the front surface, the document is sent to the document reading portion 5b after standing by for a predetermined time. The DC solenoid 40 is again turned on to press down the reversing rollers 28 after a period of time t7 from when the document reading sensor S5 detects the rear edge of the document. Then, when the document is again sent to the document reverse portion 10 and the reverse/discharge sensor S6 detects the rear edge of the document, the DC motor 18 is again reversely rotated to feed the document from the switchback path 29, but the DC solenoid 43 is turned off to switch the flapper 42 to the discharge side. When the document is discharged from the switchback path 29 as a result of the detection of the rear edge by the reverse/discharge sensor S6, simultaneously with the stop of the DC motor 18, the DC solenoid 40 is turned off to release,the pressure contact of the reversing rollers 28. While the feeding clutch 17 is turned on to start the feeding of the second sheet after a period of time t8 after the detection of the rear edge by the reverse/discharge sensor S6, the document discharge sensor S7 detects the rear edge of the document, the document is put on the discharge tray 39 and the pulse motor 35 is stopped after a period of time t9 from the detection of rear edge to complete the discharge of the first sheet. Additionally, the conveyance control for the second and succeeding sheets is effected in the same timing. Further, the documents in the original page sequence are received in the discharge tray 39.

What we claimed are:

1. An automatic document feeder comprising:

a document feeding path for guiding a document conveyed in a forward direction toward a document reading portion from a document feeding portion;

a conveying roller which forwardly and reversely rotates and conveys the document along said document feeding path, said document being conveyed in the forward direction by said conveying roller when the conveying roller is forwardly rotated;

a document discharging path for guiding said document conveyed in the forward direction toward a document discharging portion from said document reading portion; and a document shunting path for accommodating therein at least a part of said document which is conveyed in a reverse direction and which passes over said document reading portion when said conveying roller is reversely rotated, wherein said document feeding path, said document discharging path and said document shunting path are arranged with at least a part of each being overlapped with one another in a vertical direction.

2. An automatic document feeder according to claim 1, wherein the overlapping in the vertical direction of said document feeding path, said document discharging path and said document shunting path is provided on said document feeding portion side with respect to said document reading portion.

3. An automatic document feeder according to claim 1, wherein said document shunting path is branched from said document feeding path.

4. An automatic document feeder according to claim 3, wherein said document feeding path guides said document being conveyed in the reverse direction and which passes over said document reading portion toward said document shunting path.

5. An automatic document feeder according to claim 3, wherein at least a part of said document shunting path is arranged between at least a part of said document feeding path and at least a part of said document discharging path in a vertical direction.

* * * * *